United States Patent [19]
Sites et al.

[11] Patent Number: 6,167,509
[45] Date of Patent: Dec. 26, 2000

[54] BRANCH PERFORMANCE IN HIGH SPEED PROCESSOR

[75] Inventors: Richard Lee Sites, Boylston; Richard T. Witek, Littleton, both of Mass.

[73] Assignee: Compaq Computer Corporation, Houston, Tex.

[21] Appl. No.: 08/243,559

[22] Filed: May 16, 1994

Related U.S. Application Data

[63] Continuation of application No. 07/547,629, Jun. 29, 1990, abandoned.

[51] Int. Cl.$^7$ .................................................. G06F 9/00
[52] U.S. Cl. ...................... 712/237; 712/205; 712/238; 712/239
[58] Field of Search ..................... 712/205, 207, 712/211, 213, 233, 237, 239, 238

[56] References Cited

U.S. PATENT DOCUMENTS

| | | | |
|---|---|---|---|
| 4,991,080 | 2/1991 | Emma et al. ............................ | 364/200 |
| 5,050,068 | 9/1991 | Dollas et al. ........................... | 395/200 |
| 5,113,515 | 5/1992 | Fite et al. ................................ | 395/425 |
| 5,131,086 | 7/1992 | Circello et al. ......................... | 395/375 |
| 5,136,696 | 8/1992 | Beckwith et al. ...................... | 395/375 |
| 5,136,697 | 8/1992 | Johnson ................................. | 395/375 |
| 5,142,634 | 8/1992 | Fite et al. ................................ | 395/375 |
| 5,163,140 | 11/1992 | Sites et al. .............................. | 395/425 |
| 5,193,156 | 3/1993 | Yoshida et al. ......................... | 395/375 |
| 5,193,205 | 3/1993 | Matuo et al. ........................... | 395/800 |
| 5,228,131 | 7/1993 | Ueda et al. ............................. | 395/375 |

OTHER PUBLICATIONS

Intel product specification, "i860™ 64–Bit Microprocessor", Oct. 1989, pp. 5–1 to 5–72.

Kane, "MIPS R2000 RISC Architecture", Prentice Hall, 1987, pp. 1–1 to 4–11 and pp. A–1 to A–9.

Radin, "The 801 Minicomputer", IBM Research Report, Nov. 11, 1981, pp. 1–23.

Patterson et al, "Computer Architecture: A Quantitive Approach", Appendix E, "Survey of RISC Architectures", pp. E–1 to E–24, Morgan Kaufmann Pub. Inc., 1990.

*Primary Examiner*—Meng-Ai T. An
*Assistant Examiner*—Dzung C. Nguyen
*Attorney, Agent, or Firm*—Cesari and McKenna, LLP

[57] ABSTRACT

A high-performance CPU of the RISC (reduced instruction set) type employs a standardized, fixed instruction size, and permits only simplified memory access data width and addressing modes. The instruction set is limited to register-to-register operations and register load/store operations. Performance can be speeded up by predicting the target of a branch and prefetching the new instruction based upon this prediction; a branch prediction rule is followed that requires all forward branches to be predicted not-taken and all backward branches (as is common for loops) to be predicted as taken. Another performance improvement makes use of unused bits in the standard. sized instruction to provide a hint of the expected target address for jump and jump to subroutine instructions or the like. The target can thus be prefetched before the actual address has been calculated and placed in a register. In addition, the unused displacement part of the jump instruction can contain a field to define the actual type of jump, i.e., jump, jump to subroutine, return from subroutine, and thus place a predicted target address in a stack to allow prefetching before the instruction has been executed.

20 Claims, 6 Drawing Sheets

I - BOX

E - BOX

A - BOX

F - BOX

PIPELINE

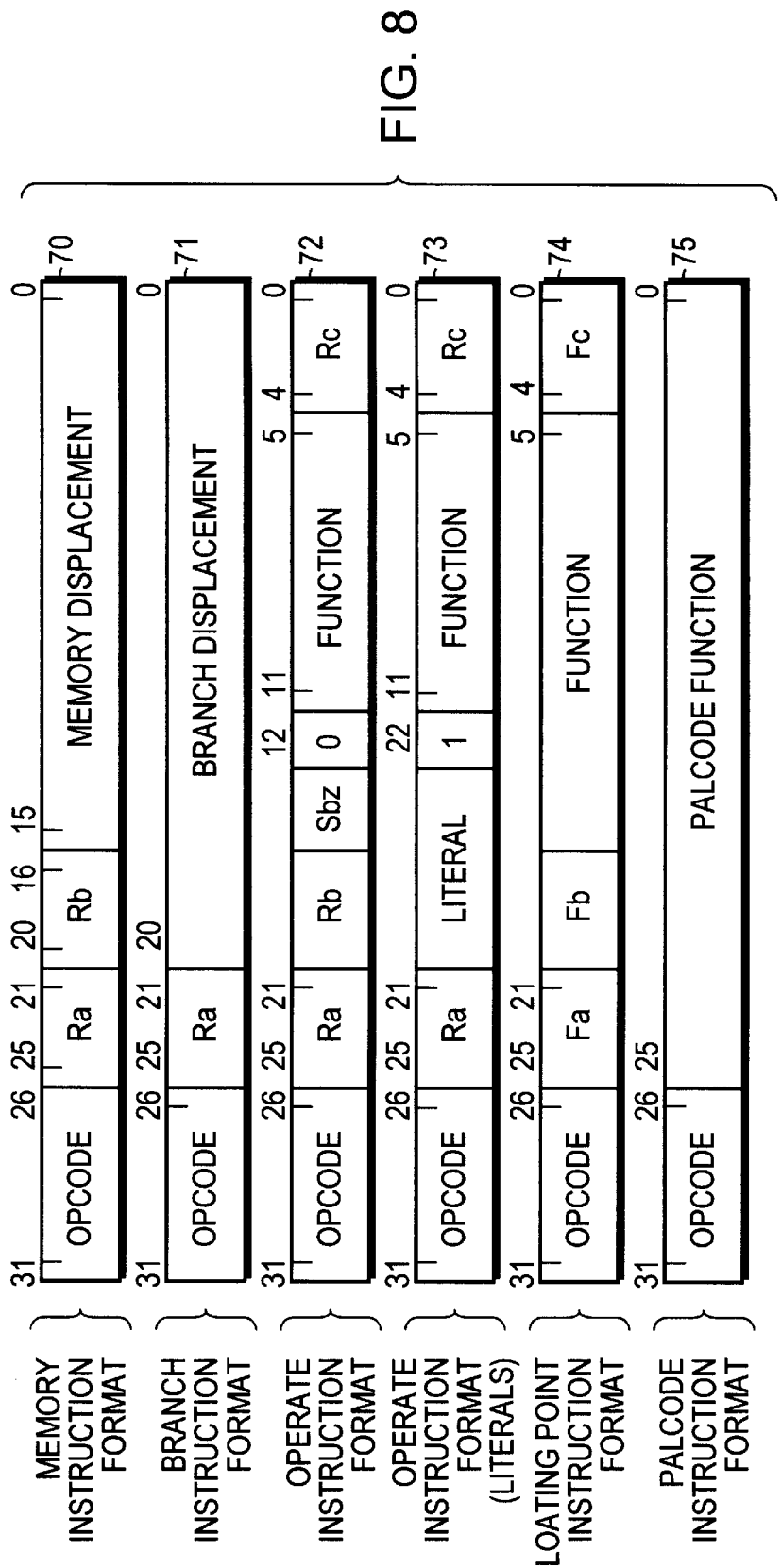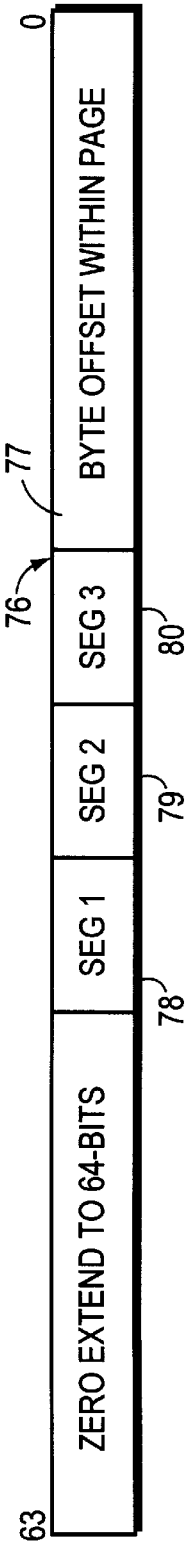

BRANCH PERFORMANCE IN HIGH SPEED PROCESSOR

This is a continuation of application Ser. No. 07/547,629, filed Jun. 29, 1990, now abandoned.

RELATED CASES

This application discloses subject matter also disclosed in the following copending applications, filed herewith and assigned to Digital Equipment Corporation, the assignee of this invention:

Ser. No. 547,589, filed Jun. 29, 1990, entitled BRANCH PREDICTION IN HIGH-PERFORMANCE PROCESSOR, by Richard L. Sites and Richard T. Witek, inventors;

Ser. No. 547,630, filed Jun. 29, 1990, entitled IMPROVING PERFORMANCE IN REDUCED INSTRUCTION SET PROCESSOR, by Richard L. Sites and Richard T. Witek, inventors;

Ser. No. 547,600, filed Jun. 29, 1990, entitled GRANULARITY HINT FOR TRANSLATION BUFFER IN HIGH PERFORMANCE PROCESSOR, by Richard L. Sites and Richard T. Witek, inventors;

Ser. No. 547,618, filed Jun. 29, 1990, entitled ENSURING DATA INTEGRITY IN MULTIPROCESSOR OR PIPELINED PROCESSOR SYSTEM, by Richard L. Sites and Richard T. Witek, inventors;

Ser. No. 547,619, filed Jun. 29, 1990, entitled IN-REGISTER DATA MANIPULATION IN REDUCED INSTRUCTION SET PROCESSOR, by Richard L. Sites and Richard T. Witek, inventors;

Ser. No. 547,684, filed Jun. 29, 1990, entitled IMPROVING COMPUTER PERFORMANCE BY ELIMINATING BRANCHES, by Richard L. Sites and Richard T. Witek, inventors; and Ser. No. 547,992, filed Jun. 29, 1990, entitled BYTE-COMPARE OPERATION FOR HIGH-PERFORMANCE PROCESSOR, by Richard L. Sites and Richard T. Witek, inventors.

BACKGROUND OF THE INVENTION

This invention relates to digital computers, and more particularly to a high-performance processor executing a reduced instruction set.

Complex instruction set or CISC processors are characterized by having a large number of instructions in their instruction set, often including memory-to-memory instructions with complex memory accessing modes. The instructions are usually of variable length, with simple instructions being only perhaps one byte in length, but the length ranging up to dozens of bytes. The VAX™ instruction set is a primary example of CISC and employs instructions having one to two byte opcodes plus from zero to six operand specifiers, where each operand specifier is from one byte to many bytes in length. The size of the operand specifier depends upon the addressing mode, size of displacement (byte, word or longword), etc. The first byte of the operand specifier describes the addressing mode for that operand, while the opcode defines the number of operands: one, two or three. When the opcode itself is decoded, however, the total length of the instruction is not yet known to the processor because the operand specifiers have not yet been decoded. Another characteristic of processors of the VAX type is the use of byte or byte string memory references, in addition to quadword or longword references; that is, a memory reference may be of a length variable from one byte to multiple words, including unaligned byte references.

Reduced instruction set or RISC processors are characterized by a smaller number of instructions which are simple to decode, and by requiring that all arithmetic/logic operations be performed register-to-register. Another feature is that of allowing no complex memory accesses; all memory accesses are register load/store operations, and there are a small number of relatively simple addressing modes, i.e., only a few ways of specifying operand addresses. Instructions are of only one length, and memory accesses are of a standard data width, usually aligned. Instruction execution is of the direct hardwired type, as distinct from microcoding. There is a fixed instruction cycle time, and the instructions are defined to be relatively simple so that they all execute in one short cycle (on average, since pipelining will spread the actual execution over several cycles).

One advantage of CISC processors is in writing source code. The variety of powerful instructions, memory accessing modes and data types should result in more work being done for each line of code (actually, compilers do not produce code taking full advantage of this), but whatever gain in compactness of source code is accomplished at the expense of execution time. Particularly as pipelining of instruction execution has become necessary to achieve performance levels demanded of systems presently, the data or state dependencies of successive instructions, and the vast differences in memory access time vs. machine cycle time, produce excessive stalls and exceptions, slowing execution. The advantage of RISC processors is the speed of execution of code, but the disadvantage is that less is accomplished by each line of code, and the code to accomplish a given task is much more lengthy. One line of VAX code can accomplish the same as many lines of RISC code.

When CPUs were much faster than memory, it was advantageous to do more work per instruction, because otherwise the CPU would always be waiting for the memory to deliver instructions—this factor led to more complex instructions that encapsulated what would be otherwise implemented as subroutines. When CPU and memory speed became more balanced, a simple approach such as that of the RISC concepts becomes more feasible, assuming the memory system is able to deliver one instruction and some data in each cycle. Hierarchical memory techniques, as well as faster access cycles, provide these faster memory speeds. Another factor that has influenced the CISC vs. RISC choice is the change in relative cost of off-chip vs. on-chip interconnection resulting from VLSI construction of CPUs. Construction on chips instead of boards changes the economics—first it pays to make the architecture simple enough to be on one chip, then more on-chip memory is possible (and needed) to avoid going off-chip for memory references. A further factor in the comparison is that adding more complex instructions and addressing modes as in a CISC solution complicates (thus slows down) stages of the instruction execution process. The complex function might make the function execute faster than an equivalent sequence of simple instructions, but it can lengthen the instruction cycle time, making all instructions execute slower; thus an added function must increase the overall performance enough to compensate for the decrease in the instruction execution rate.

The performance advantages of RISC processors, taking into account these and other factors, is considered to outweigh the shortcomings, and, were it not for the existing software base, most new processors would probably be designed using RISC features. A problem is that business enterprises have invested many years of operating background, including operator training as well as the cost of the code itself, in applications programs and data structures using the CISC type processors which were the most widely used in the past ten or fifteen years. The expense and disruption of operations to rewrite all of the code and data structures to accommodate a new processor architecture may not be justified, even though the performance advantages ultimately expected to be achieved would be substantial.

Accordingly, the objective is to accomplish all of the performance advantages of a RISC-type processor architecture, but yet allow the data structures and code previously generated for existing CISC-type processors to be translated for use in a high-performance processor.

SUMMARY OF THE INVENTION

In accordance with one embodiment of the invention, a high-performance processor is provided which is of the RISC type, using a standardized, fixed instruction size, and permitting only a simplified memory access data width, using simple addressing modes. The instruction set is limited to register-to-register operations (for arithmetic and logic type operations using the ALU, etc.) and register load/store operations where memory is referenced; there are no memory-to-memory operations, nor register-to-memory operations in which the ALU or other logic functions are done, The functions performed by instructions are limited to allow non-microcoded implementation, simple to decode and execute in a short cycle. On-chip floating point processing is provided, and on-chip instruction and data caches are employed in an example embodiment.

Byte manipulation instructions are included to permit use of previously-established data structures. These instructions include the facility for doing in-register byte extract, insert and masking, along with non-aligned load and store instructions, so that byte addresses can be made use of even though the actual memory operations are aligned quadword in nature.

The provision of load/locked and store/conditional instructions permits the implementation of atomic byte writes. To write to a byte address in a multibyte (e.g., quadword) aligned memory, the CPU loads a quadword (or longword) and locks this location, writes to the byte address in register while leaving the remainder of the quadword undisturbed, then stores the updated quadword in memory conditionally, depending upon whether the quadword has been written by another processor since the load/locked operation.

Another byte manipulation instruction, according to one feature of the invention, is a byte compare instruction. All bytes of a quadword in a register are compared to corresponding bytes in another register. The result is a single byte (one bit for each byte compared) in a third register. Since this operation is done to a general purpose register (rather than to a special hardware location), several of the byte compares can be done in sequence, and no added state must be accounted for upon interrupt or the like. This byte compare can be used to advantage with a byte zeroing instruction in which selected bytes of a quadword are zeroed, with the bytes being selected by bits in a low-order byte of a register. That is, the result of a byte compare can be used to zero bytes of another register.

Speed of execution is highly dependent on the sequentiality of the instruction stream; branches disrupt the sequence and generate stalls while the prefetched instruction stream is flushed and a new sequence is begun. By providing a conditional move instruction, many short branches can be eliminated altogether. A conditional move instruction tests a register and moves a second register to a third if the condition is met; this function can be substituted for short branches and thus maintain the sequentiality of the instruction stream.

If branches cannot be avoided, the performance can be speeded up by predicting the target of a branch and prefetching the new instruction based upon this prediction. According to a feature of one embodiment, a branch prediction rule is followed that requires all forward branches to be predicted not-taken and all backward branches (as is common for loops) to be predicted as taken. Upon compilation, the code is rearranged to make sure the most likely path is backward rather than forward, so more often than not the predicted path is taken and the proper instruction is prefetched.

Another performance improvement is to make use of unused bits in the standard-sized instruction to provide a hint of the expected target address for jump and jump to subroutine instructions or the like. The target can thus be prefetched before the actual address has been calculated and placed in a register. If the target address of the hint matches the calculated address when the instruction is executed, then the prefetched address is already in the pipeline and will execute much faster. The hint is added to the jump instruction by the compiler.

In addition, the unused displacement part of the jump instruction can contain a field to define the actual type of jump, i.e., jump, jump to subroutine, return from subroutine, and thus place a predicted target address in a stack to allow prefetching before the instruction has been executed, or take other action appropriate to the operation defined by the hint. A hint may be ignored by the hardware, and if so the code still executes properly, just slower.

According to a feature of one embodiment, the processor employs a variable memory page size, so that the entries in a translation buffer for implementing virtual addressing can be optimally used. A granularity hint is added to the page table entry to define the page size for this entry. If a large number of sequential pages share the same protection and access rights, all of these pages can be referenced with the same page table entry, and so the use of the translation buffer becomes more efficient. The likelihood of a hit in the translation buffer is increased, so the number of faults to access the page tables is minimized.

An additional feature is the addition of a prefetch instruction which serves to move a block of data to a faster-access cache in the memory hierarchy before the data block is to be used. This prefetch instruction would be inserted by the compiler to perform a function similar to that of a vector processor, but does not require vector hardware. The prefetch instruction does not generate memory exceptions or protection or access violations, and so does not slow down execution if the prefetch fails. Again, the instruction is optional, and if the processor cannot execute it the normal code executes without problems.

BRIEF DESCRIPTION OF THE DRAWINGS

The novel features believed characteristic of the invention are set forth in the appended claims. The invention itself, however, as well as other features and advantages thereof, will be best understood by reference to the detailed description of specific embodiments which follows, when read in conjunction with the accompanying drawings, wherein:

FIG. 8 is a diagram of the instruction formats used in the instruction set of the CPU of FIGS. 1–6;

FIG. 9 is a diagram of the format of a virtual address used in the CPU of FIGS. 1–6;

DETAILED DESCRIPTION OF SPECIFIC EMBODIMENT

Figure 1:
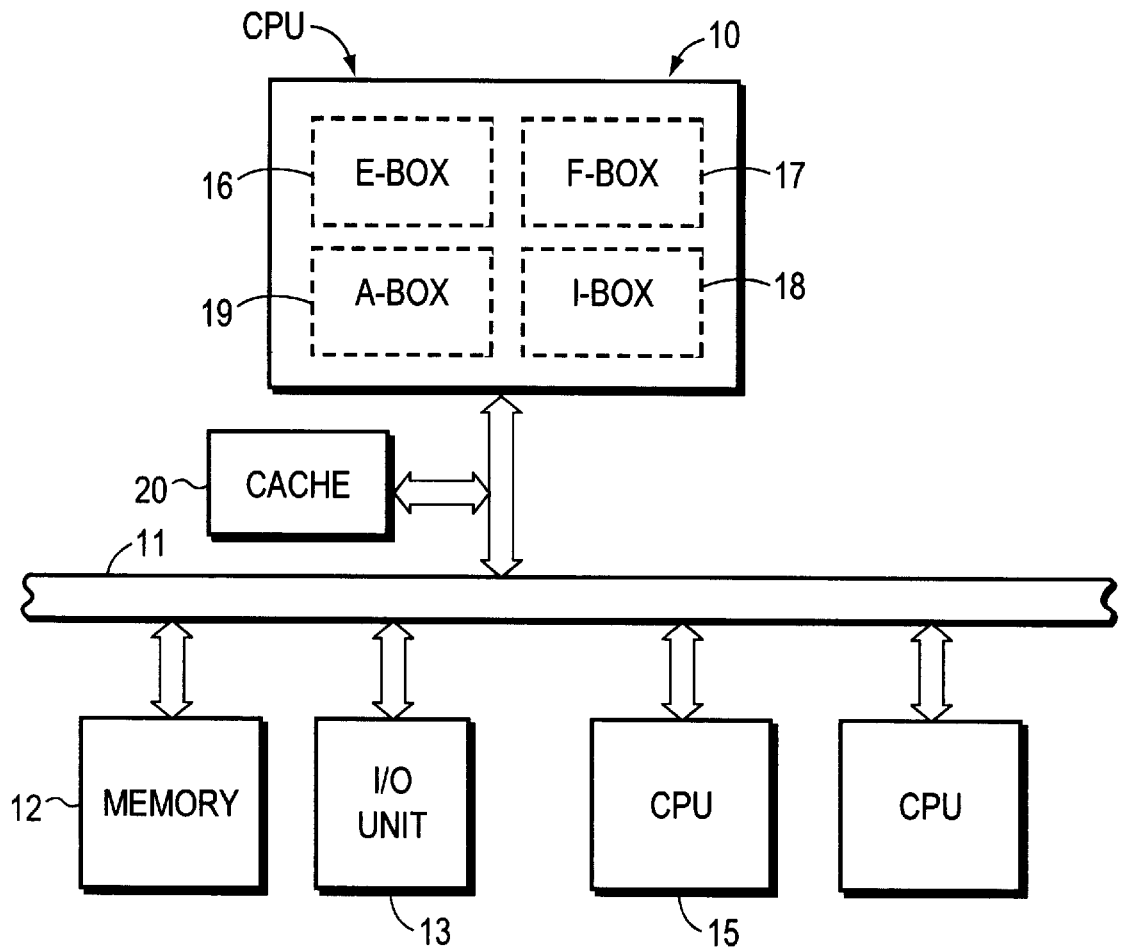
FIG. 1 is an electrical diagram in block form of a computer system employing a CPU which may employ features of the invention.

Referring to FIG. 1, a computer system which may use features of the invention, according to one embodiment, includes a CPU 10 connected by a system bus 11 to a main memory 12, with an I/O unit (not shown) also accessed via the system bus. The system may be of various levels, from a stand-alone workstation up to a mid-range multiprocessor, in which case other CPUs such as a CPU 15 also access the main memory 12 via the system bus 11.

The CPU 10 is preferably a single-chip integrated circuit device, although features of the invention could be employed in a processor constructed in multi-chip form. Within the single chip an integer execution unit 16 (referred to as the "E-box") is included, along with a floating point execution unit 17 (referred to as the "F-box"). Instruction fetch and decoding is performed in an instruction unit 18 or "I-box", and an address unit or "A-box" 19 performs the functions of address generation, memory management, write buffering and bus interface. The memory is hierarchical, with on-chip instruction and data caches being included in the instruction unit 18 and address unit 19 in one embodiment, while a larger, second-level cache 20 is provided off-chip, being controlled by a cache controller in the address unit 19.

Figure 2:
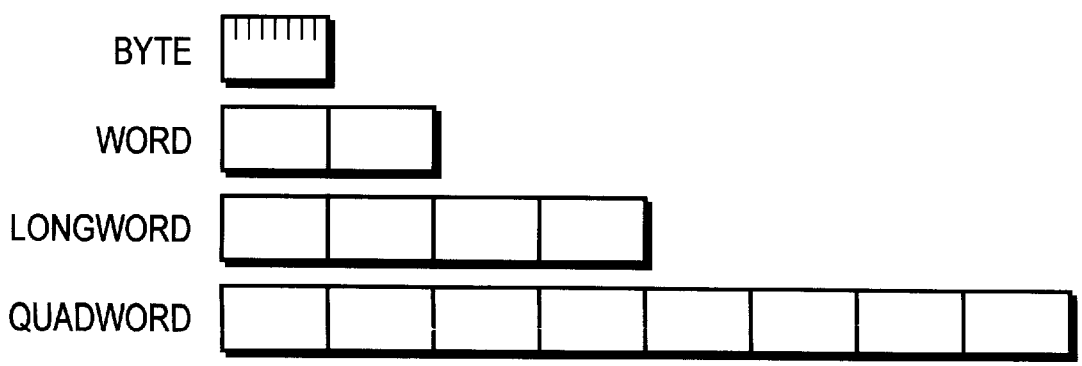
FIG. 2 is a diagram of data types used in the processor of FIG. 1.

The CPU 10 employs an instruction set as described below in which all instructions are of a fixed size, in this case 32-bit or one longword. The instruction and data types employed are for byte, word, longword and quadword, as illustrated in FIG. 2. As used herein, a byte is 8-bits, a word is 16-bits or two bytes, a longword is 32-bits or four bytes, and a quadword is 64-bits or eight bytes. The data paths and registers within the CPU 10 are generally 64-bit or quadword size, and the memory 12 and caches use the quadword as the basic unit of transfer. Performance is enhanced by allowing only quadword or longword loads and stores, although, in order to be compatible with data types used in prior software development, byte manipulation is allowed by certain unique instructions, still maintaining the feature of only quadword or longword loads and stores.

Figure 3:
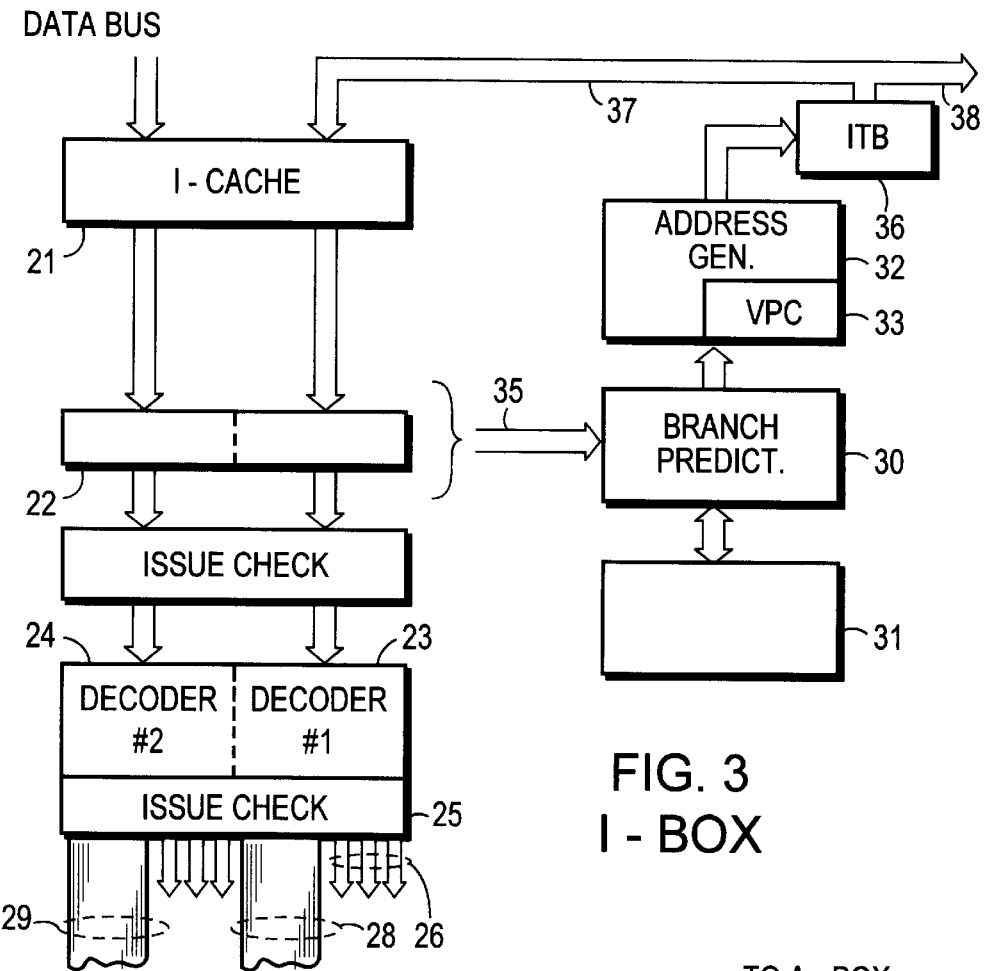
FIG. 3 is an electrical diagram in block form of the instruction unit or I-box of the CPU of FIG. 1.

Referring to FIG. 3, the instruction unit 18 or I-box is shown in more detail. The primary function of the instruction unit 18 is to issue instructions to the E-box 16, A-box 19 and F-box 17. The instruction unit 18 includes an instruction cache 21 which stores perhaps 8 Kbytes of instruction stream data, and a quadword (two instructions) of this instruction stream data is loaded to an instruction register 22 in each cycle where the pipeline advances. The instruction unit 18, in a preferred embodiment, decodes two instructions in parallel in decoders 23 and 24, then checks that the required resources are available for both instructions by check circuitry 25. If resources are available and dual issue is possible then both instructions may be issued by applying register addresses on busses 26 and 27 and control bits on microcontrol busses 28 and 29 to the appropriate elements in the CPU 10. If the resources are available for only the first instruction or the instructions cannot be dual issued then the instruction unit 18 issues only the first instruction from the decoder 23. The instruction unit 18 does not issue instructions out of order, even if the resources are available for the second instruction (from decoder 24) and not for the first instruction. The instruction unit 18 does not issue instructions until the resources for the first instruction become available. If only the first of a pair of instructions issues (from the decoder 23), the instruction unit 18 does not advance another instruction into the instruction register 22 to attempt to dual issue again. Dual issues is only attempted on aligned quadword pairs as fetched from memory (or instruction cache 21) and loaded to instruction register 22 as an aligned quadword.

The instruction unit 18 contains a branch prediction circuit 30 responsive to the instructions in the instruction stream to be loaded into register 22. The prediction circuit 30 along with a subroutine return stack 31 is used to predict branch addresses and to cause address generating circuitry 32 to prefetch the instruction stream before needed. The subroutine return stack 31 (having four-entries, for example) is controlled by the hint bits in the jump, jump to subroutine and return instructions as will be described. The virtual PC (program counter) 33 is included in the address generation circuitry 32 to produce addresses for instruction stream data in the selected order.

One branch prediction method is the use of the value of the sign bit of the branch displacement to predict conditional branches, so the circuit 30 is responsive to the sign bit of the displacement appearing in the branch instructions appearing at inputs 35. If the sign bit is negative, it predicts the branch is taken, and addressing circuit 32 adds the displacement to register Ra to produce the first address of the new address sequence to be fetched. If the sign is positive it predicts not taken, and the present instruction stream is continued in sequence.

The instruction unit 18 contains an 8-entry fully associative translation buffer (TB) 36 to cache recently used instruction-stream address translations and protection information for 8 Kbyte pages. Although 64-bit addresses are nominally possible, as a practical matter 43-bit addresses are adequate for the present. Every cycle the 43-bit virtual program counter 33 is presented to the instruction stream TB 36. If the page table entry (PTE) associated with the virtual PC is cached in the TB 36 then the page frame number (PFN) and protection bits for the page which contains the virtual PC is used by the instruction unit 18 to complete the address translation and access checks. A physical address is thus applied to the address input 37 of the instruction cache 21, or if there is a cache miss then this instruction stream physical address is applied by the bus 38 through the address unit 19 to the cache 20 or memory 12. In a preferred embodiment, the instruction stream TB 36 supports any of the four granularity hint block sizes as defined below, so that the probability of a hit in the TB 36 is increased.

Figure 4:
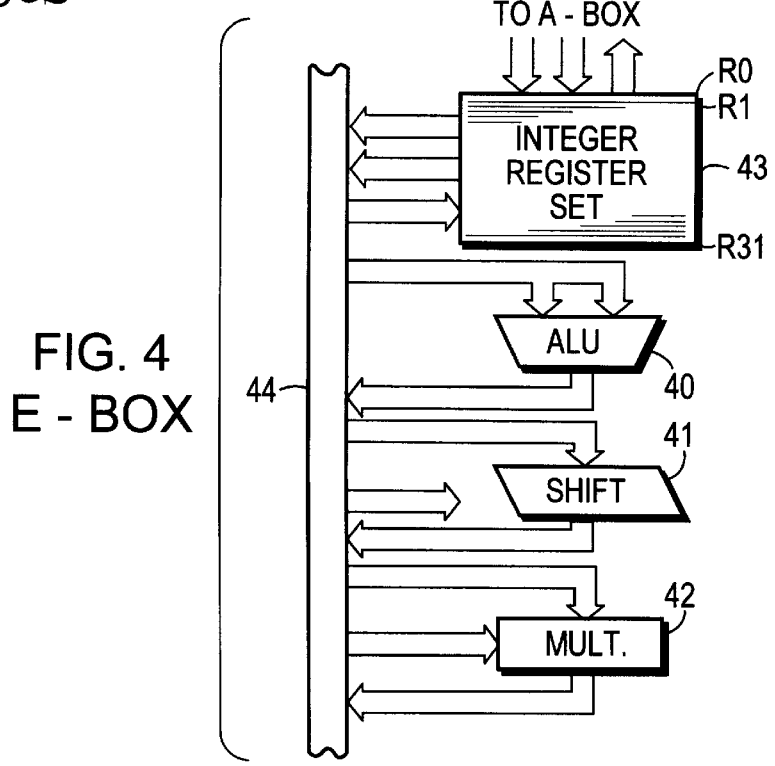
FIG. 4 is an electrical diagram in block form of the integer execution unit or E-box in the CPU of FIG. 1.

The execution unit or E-box 16 is shown in more detail in FIG. 4., The execution unit 16 contains the 64-bit integer execution datapath including an arithmetic/logic unit (ALU) 40, a barrel shifter 41, and an integer multiplier 42. The execution unit 16 also contains the 32-register 64-bit wide register file 43, containing registers R0 to R31, although R31 is hardwired as all zeros. The register file 43 has four read ports and two write ports which allow the sourcing (sinking) of operands (results) to both the integer execution datapath and the address unit 19. A bus structure 44 connects two of the read ports of the register file 43 to the selected inputs of the ALU 40, the shifter 41 or the multiplier 42 as specified by the control bits of the decoded instruction on busses 28 or 29 from the instruction unit 18, and connects the output of the appropriate function to one of the write ports to store the result. That is, the address fields from the instruction are applied by the busses 26 or 27 to select the registers to be used in executing the instruction, and the control bits on the busses 28 or 29 to define the operation in the ALU, etc., and further define which internal busses of the bus structure 44 are to be used when, etc.

Figure 5:
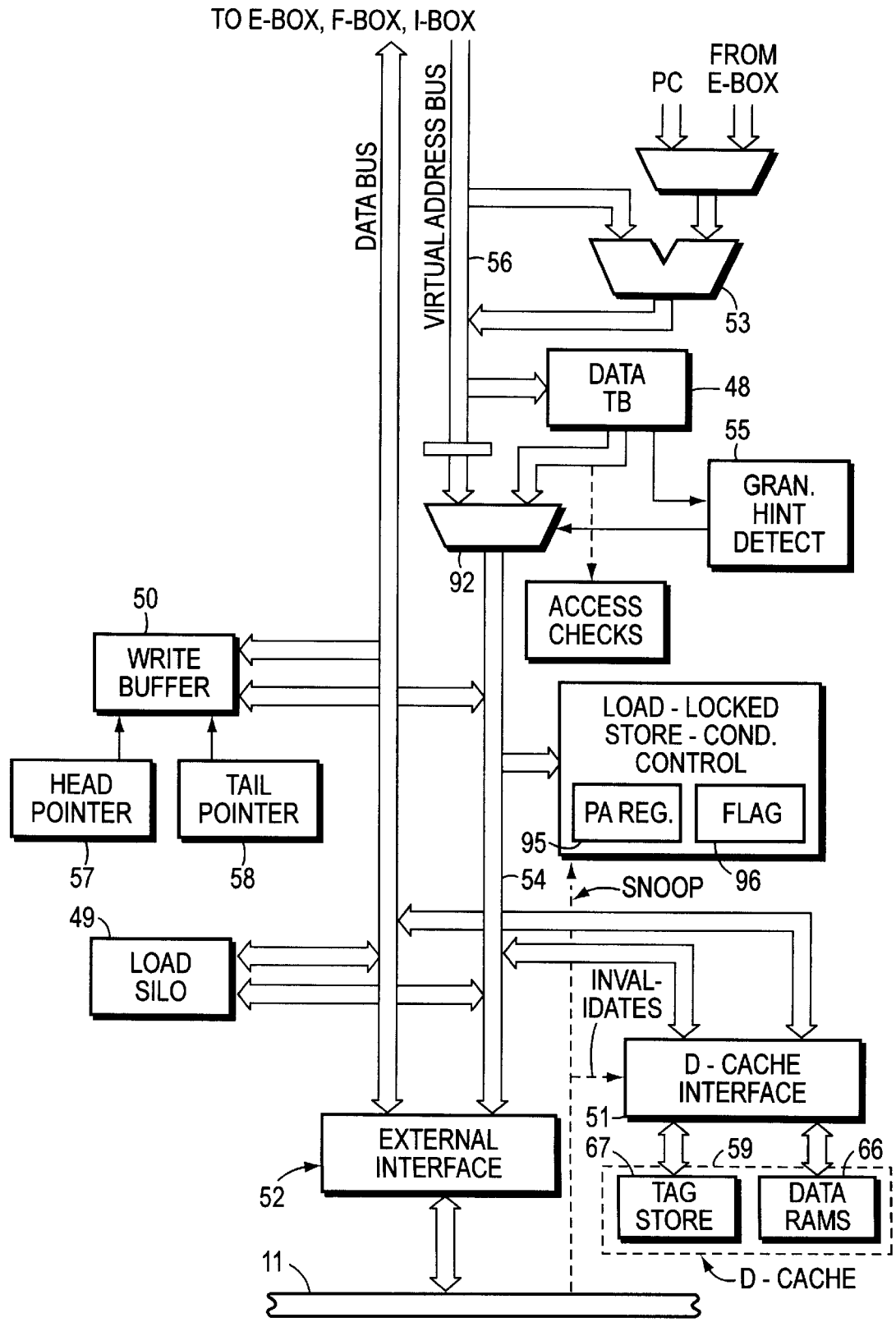
FIG. 5 is an electrical diagram in block form of the addressing unit or A-box in the CPU of FIG. 1.

The A-box or address unit 19 is shown in more detail in FIG. 5. The A-box 19 includes five functions: address translation using a translation buffer 48, a load silo 49 for incoming data, a write buffer 50 for outgoing write data, an interface 51 to a data cache, and the external interface 52 to the bus 11. The address translation datapath has the displacement adder 53 which generates the effective address (by accessing the register file 43 via the second set of read and write ports, and the PC), the data TB 48 which generates the physical address on address bus 54, and muxes and bypassers needed for the pipelining.

The 32-entry fully associative data translation buffer 48 caches recently-used data-stream page table entries for 8 Kbyte pages. Each entry supports any of the four granularity hint block sizes, and a detector 55 is responsive to the granularity hint as described below to change the number of low-order bits of the virtual address passed through from virtual address bus 56 to the physical address bus 54.

For load and store instructions, the effective 43-bit virtual address is presented to TB 48 via bus 56. If the PTE of the supplied virtual address is cached in the TB 48, the PFN and protection bits for the page which contains the address are used by the address unit 19 to complete the address translation and access checks.

The write buffer 50 has two purposes: (1) To minimize the number of CPU stall cycles by providing a high bandwidth (but finite) resource for receiving store data. This is required since the CPU 10 can generate store data at the peak rate of one quadword every CPU cycle which may be greater than the rate at which the external cache 20 can accept the data; and (2) To attempt to aggregate store data into aligned 32-byte cache blocks for the purpose of maximizing the rate at which data may be written from the CPU 10 into the external cache 20. The write buffer 50 has eight entries. A write buffer entry is invalid if it does not contain data to be written or is valid if it contains data to be written. The write buffer 50 contains two pointers: the head pointer 57 and the tail pointer 58. The head pointer 57 points to the valid write buffer entry which has been valid the longest period of time. The tail pointer 58 points to the valid buffer entry slot which will next be validated. If the write buffer 50 is completely full (empty) the head and tail pointers point to the same valid (invalid) entry. Each time the write buffer 50 is presented with a new store instruction the physical address generated by the instruction is compared to the address in each valid write buffer entry. If the address is in the same aligned 32-byte block as an address in a valid write buffer entry then the store data is merged into that entry and the entry's longword mask bits are updated. If no matching address is found in the write buffer then the store data is written into the entry designated by the tail pointer 58, the entry is validated, and the tail pointer 58 is incremented to the next entry.

The address unit 19 contains a fully folded memory reference pipeline which may accept a new load or store instruction every cycle until a fill of a data cache 59 ("D-cache") is required. Since the data cache 59 lines are only allocated on load misses, the address unit 19 may accept a new instruction every cycle until a load miss occurs. When a load miss occurs the instruction unit 18 stops issuing all instructions that use the load port of the register file 43 (load, store, jump subroutine, etc., instructions).

Since the result of each data cache 59 lookup is known late in the pipeline (stage S7 as will be described) and instructions are issued in pipe stage S3, there may be two instructions in the address unit 19 pipeline behind a load instruction which misses the data cache 59. These two instructions are handled as follows: First, loads which hit the data cache 59 are allowed to complete, hit under miss. Second, load misses are placed in the silo 49 and replayed in order after the first load miss completes. Third, store instructions are presented to the data cache 59 at their normal time with respect to the pipeline. They are silo'ed and presented to the write buffer 50 in order with respect to load misses.

Figure 6:
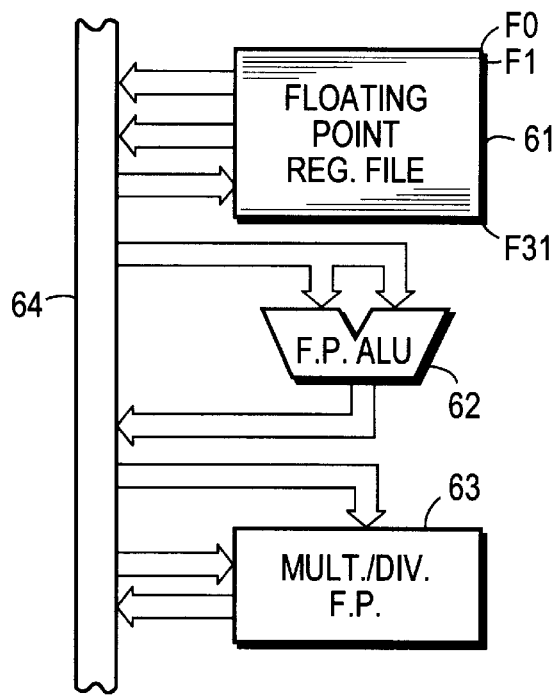
FIG. 6 is an electrical diagram in block form of the floating point execution unit or F-box in the CPU of FIG. 1.

The on-chip pipelined floating point unit 17 or F-box as shown in more detail in FIG. 6 is capable of executing both DEC and IEEE floating point instructions according to the instruction set to be described. The floating point unit 17 contains a 32-entry, 64-bit, floating point register file 61, and a floating point arithmetic and logic unit 62. Divides and multiplies are performed in a multiply/divide circuit 63. A bus structure 64 interconnects two read ports of the register file 61 to the appropriate functional circuit as directed by the control bits of the decoded instruction on busses 28 or 29 from the instruction unit 18. The registers selected for an operation are defined by the output buses 26 or 27 from the instruction decode. The floating point unit 17 can accept an instruction every cycle, with the exception of floating point divide instructions, which can be accepted only every several cycles. A latency of more than one cycle is exhibited for all floating point instructions.

In an example embodiment, the CPU 10 has an 8 Kbyte data cache 59, and 8 Kbyte instruction cache 21, with the size of the caches depending on the available chip area. The on-chip data cache 59 is write-through, direct mapped, read-allocate physical cache and has 32-byte (1-hexaword) blocks. The system may keep the data cache 59 coherent with memory 12 by using an invalidate bus, not shown. The data cache 59 has longword parity in the data array 66 and there is a parity bit for each tag entry in tag store 67.

The instruction cache 21 may be 8 Kbytes, or 16 Kbytes, for example, or may be larger or smaller, depending upon die area. Although described above as using physical addressing with a TB 36, it may also be a virtual cache, in which case it will contain no provision for maintaining its coherence with memory 12. If the cache 21 is a physical addressed cache the chip will contain circuitry for maintaining its coherence with memory: (1) when the write buffer 50 entries are sent to the bus interface 52, the address will be compared against a duplicate instruction cache 21 tag, and the corresponding block of instruction cache 21 will be conditionally invalidated; (2) the invalidate bus will be connected to the instruction cache 21.

The main data paths and registers in the CPU 10 are all 64-bits wide. That is, each of the integer registers 43, as well as each of the floating point registers 61, is a 64-bit register, and the ALU 40 has two 64-bit inputs 40a and 40b and a 64-bit output 40c. The bus structure 44 in the execution unit 16, which actually consists of more than one bus, has 64-bit wide data paths for transferring operands between the integer registers 43 and the inputs and output of the ALU 40. The instruction decoders 23 and 24 produce register address outputs 26 and 27 which are applied to the addressing circuits of the integer registers 43 and/or floating point registers 61 to select which register operands are used as inputs to the ALU 40 or 62, and which of the registers 43 or registers 61 is the destination for the ALU (or other functional unit output.

The dual issue decision is made by the circuitry 25 according to the following requirement, where only one instruction from the first column and one instruction from the second column can be issued in one cycle:

| Column A | Column B |
|---|---|
| Integer Operate | Floating Operate |
| Floating Load/Store | Integer Load/Store |
| Floating Branch | Integer Branch |
|  | JSR |

That is, the CPU 10 can allow dual issue of an integer load or store instruction with an integer operate instruction, but not an integer branch with an integer load or store. Of course, the circuitry 25 also checks to see if the resources are available before allowing two instructions to issue in the same cycle.

An important feature is the RISC characteristic of the CPU 10 of FIGS. 1–6. The instructions executed by this CPU 10 are always of the same size, in this case 32-bits, instead of allowing variable-length instructions. The instructions execute on average in one machine cycle (pipelined as described below, and assuming no stalls), rather than a variable number of cycles. The instruction set includes only register-to-register arithmetic/logic type of operations, or register-to-memory (or memory-to-register) load/store type of operations, and there are no complex memory addressing modes such as indirect, etc. An instruction performing an operation in the ALU 40 always gets its operands from the register file 43 (or from a field of the instruction itself) and always writes the result to the register file 43; these operands are never obtained from memory and the result is never written to memory. Loads from memory are always to a register in register files 43 or 61, and stores to memory are always from a register in the register files.

Figure 7:
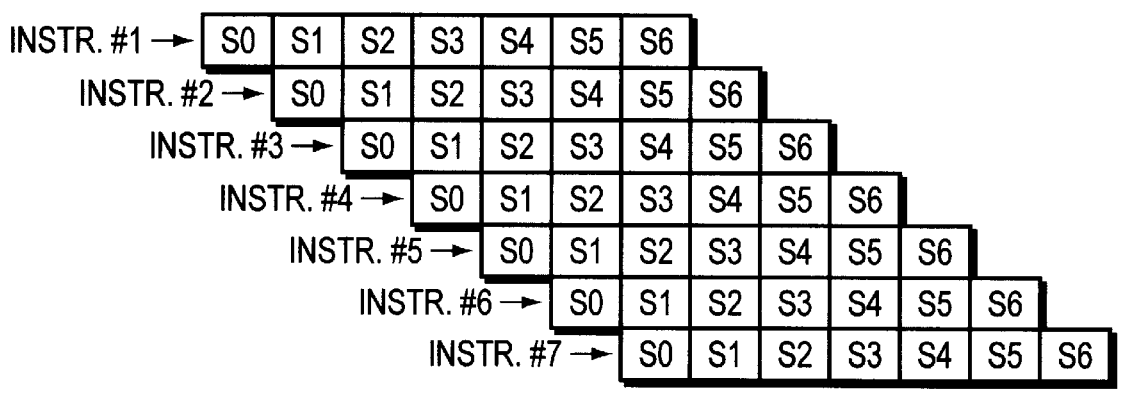
FIG. 7 is a timing diagram of the pipelining in the CPU of FIGS. 1–6.

Referring to FIG. 7, the CPU 10 has a seven stage pipeline for integer operate and memory reference instructions. The instruction unit 18 has a seven stage pipeline to determine instruction cache 21 hit/miss. FIG. 7 is a pipeline diagram for the pipeline of execution unit 16, instruction unit 18 and address unit 19. The floating point unit 17 defines a pipeline in parallel with that of the execution unit 16, but ordinarily employs more stages to execute. The seven stages are referred to as S0–S6, where a stage is to be executed in one machine cycle (clock cycle). The first four stages S0, S1, S2 and S3 are executed in the instruction unit 18, and the last three stages S4, S5 and S6 are executed in one or the other of the execution unit 16 or address unit 19, depending upon whether the instruction is an operate or a load/store. There are bypassers in all of the boxes that allow the results of one instruction to be used as operands of a following instruction without having to be written to the register file 43 or 61.

The first stage S0 of the pipeline is the instruction fetch or IF stage, during which the instruction unit 18 fetches two new instructions from the instruction cache 21, using the PC 33 address as a base. The second stage S1 is the swap stage, during which the two fetched instructions are evaluated by the circuit 25 to see if they can be issued at the same time. The third stage S2 is the decode stage, during which the two instructions are decoded in the decoders 23 and 24 to produce the control signals 28 and 29 and register addresses 26 and 27. The fourth stage S3 is the register file 43 access stage for operate instructions, and also is the issue check decision point for all instructions, and the instruction issue stage. The fifth stage S4 is cycle one of the computation (in ALU 40, for example) if it is an operate instruction, and also the instruction unit 18 computes the new PC 33 in address generator 32; if it is a memory reference instruction the address unit 19 calculates the effective data stream address using the adder 53. The sixth stage SS is cycle two of the computation (e.g., in ALU 40) if it is an operate instruction, and also the data TB 48 lookup stage for memory references. The last stage S6 is the write stage for operate instructions having a register write, during which, for example, the output 40c of the ALU 40 is written to the register file 43 via the write port, and is the data cache 59 or instruction cache 21 hit/miss decision point for instruction stream or data stream references.

The CPU 10 pipeline divides these seven stages S0–S6 of instruction processing into four static and three dynamic stages of execution. The first four stages S0–S3 consist of the instruction fetch, swap, decode and issue logic as just described. These stages S0–S3 are static in that instructions may remain valid in the same pipeline stage for multiple cycles while waiting for a resource or stalling for other reasons. These stalls are also referred to as pipeline freezes. A pipeline freeze may occur while zero instructions issue, or while one instruction of a pair issues and the second is held at the issue stage. A pipeline freeze implies that a valid instruction or instructions is (are) presented to be issued but can not proceed.

Upon satisfying all issue requirements, instructions are allowed to continue through the pipeline toward completion. After issuing in S3, instructions can not be held in a given pipe stage S4–S6. It is up to the issue stage S3 (circuitry 25) to insure that all resource conflicts are resolved before an instruction is allowed to continue. The only means of stopping instructions after the issue stage S3 is an abort condition.

Aborts may result from a number of causes. In general, they may be grouped into two classes, namely exceptions (including interrupts) and non-exceptions. The basic difference between the two is that exceptions require that the pipeline be flushed of all instructions which were fetched subsequent to the instruction which caused the abort condition, including dual issued instructions, and restart the instruction fetch at the redirected address. Examples of non-exception abort conditions are branch mispredictions, subroutine call and return mispredictions and instruction cache 21 misses. Data cache 59 misses do not produce abort conditions but can cause pipeline freezes.

In the event of an exception, the CPU 10 first aborts all instructions issued after the excepting instruction. Due to the nature of some error conditions, this may occur as late as the write cycle. Next, the address of the excepting instruction is latched in an internal processor register. When the pipeline is fully drained the processor begins instruction execution at the address given by a dispatch using a PALcode. The pipeline is drained when all outstanding writes to both the integer and floating point register file 43 and 61 have completed and all outstanding instructions have passed the point in the pipeline such that all instructions are guaranteed to complete without an exception in the absence of a machine check.

Referring to FIG. 8, the formats of the various types of instructions of the instruction set executed by the CPU 10 of FIGS. 1–7 are illustrated. One type is a memory instruction 70, which contains a 6-bit opcode in bits <31:26>, two 5-bit register address fields Ra and Rb in bits <25:21> and <20:16>, and a 16-bit signed displacement in bits <15:0>. This instruction is used to transfer data between registers 43 and memory (memory 12 or caches 59 or 20), to load an effective address to a register of the register file, and for subroutine jumps. The displacement field <15:0> is a byte offset; it is sign-extended and added to the contents of register Rb to form a virtual address. The virtual address is used as a memory load/store address or a result value depending upon the specific instruction.

The branch instruction format 71 is also shown in FIG. 8, and includes a 6-bit opcode in bits <31:26>, a 5-bit address field in bits <25:21>, and a 21-bit signed branch displacement in bits <20:0>. The displacement is treated as a longword offset, meaning that it is shifted left two bits (to address a longword boundary), sign-extended to 64-bits and added to the updated contents of PC 33 to form the target virtual address (overflow is ignored).

The operate instructions 72 and 73 are of the formats shown in FIG. 8, one format 72 for three register operands and one format 73 for two register operands and a literal. The operate format is used for instructions that perform integer register operations, allowing two source operands and one destination operand in register file 43. One of the source operands can be a literal constant. Bit-12 defines whether the operate instruction is for a two source register operation or one source register and a literal. In addition to the 6-bit opcode at bits <31:26>, the operate format has a 7-bit function field at bits <11:5> to allow a wider range of choices for arithmetic and logical operation. The source register Ra is specified in either case at bits <25:21>, and the destination register Rc at <4:0>. If bit-12 is a zero, the source register Rb is defined at bits <20:16>, while if bit-12 is a one then an 8-bit zero-extended literal constant is formed by bits <20:13> of the instruction. This literal is interpreted as a positive integer in the range 0–255, and is zero-extended to 64-bits.

FIG. 8 also illustrates the floating point operate instruction format 74, used for instructions that perform floating point register 61 to floating point register 61 operations. The floating point operate instructions contain a 6-bit opcode at bits <31:26> as before, along with an 11-bit function field at bits <15:5>. There are three operand fields, Fa, Fb and Fc, each specifying either an integer or a floating-point operand as defined by the instruction; only the registers 13 are specified by Fa, Fb and Fc, but these registers can contain either integer or floating-point values. Literals are not supported. Floating point conversions use a subset of the floating point operate format 74 of FIG. 8 and perform register-to-register conversion operations; the Fb operand specifies the source and the Fa operand should be reg-31 (all zeros).

The other instruction format 75 of FIG. 8 is that for privileged architecture library (PAL or PALcode) instructions, which are used to specify extended processor functions. In these instructions a 6-bit opcode is present at bits <31:26> as before, and a 26-bit PALcode function field <25:0> specifies the operation. The source and destination operands for PALcode instructions are supplied in fixed registers that are specified in the individual instruction definitions.

The six-bit opcode field <31:26> in the instruction formats of FIG. 8 allows only $2^6$ or sixty-four different instructions to be coded. Thus the instruction set would be limited to sixty-four. However, the "function" fields in the instruction formats 72, 73 and 74 allow variations of instructions having the same opcode in bits <31:26>. Also, the "hint" bits in the jump instruction allow variations such as JSR, RET, as explained below.

Referring to FIG. 9, the format 76 of the virtual address asserted on the internal address bus 56 is shown. This address is nominally 64-bits in width, but of course practical implementations within the next few years will use much smaller addresses. For example, an address of 43-bits provides an addressing range of 8-Terabytes. The format includes a byte offset 77 of, for example, 13-bits to 16-bits in size, depending upon the page size employed. If pages are 8-Kbytes, the byte-within-page field 77 is 13-bits, for 16-Kbyte pages the field 77 is 14-bits, for 32-Kbyte pages it is 15-bits, and for 64-Kbyte pages it is 16-bits. The format 76 as shown includes three segment fields 78, 79 and 80, labelled Seg1, Seg2 and Seg3, also of variable size depending upon the implementation. The segments Seg1, Seg2, and Seg3 can be 10-to-13 bits, for example. If each segment size is 10-bits, then a segment defined by Seg3 is 1K pages, a segment for Seg2 is 1M pages, and a segment for Seg4 is 1G pages. Segment number fields Seg1, Seg2 and Seg3 are of the same size for a given implementation. The segment number fields are a function of the page size; all page table entries at a given level do not exceed one page, so page swapping to access the page table is minimized. The page frame number (PFN) field in the PTE is always 32-bits wide; thus, as the page size grows the virtual and physical address size also grows.

The physical addresses are at most 48-bits, but a processor may implement a smaller physical address space by not implementing some number of high-order bits. The two most significant implemented physical address bits select a caching policy or implementation-dependent type of address space. Different implementations may put different uses and restrictions on these bits as appropriate for the system. For example, in a workstation with a 30-bit <29:0> physical address space, bit <29> may select between memory and I/O and bit <284> may enable or disenable caching in I/O space and must be zero in memory space.

Typically, in a multiprogramming system, several processes may reside in physical memory 12 (or caches) at the same time, so memory protection and multiple address spaces are used by the CPU 10 to ensure that one process will not interfere with either other processes or the operating system. To further improve software reliability, four hierarchical access modes provide memory access control. They are, from most to least privileged: kernel, executive, supervisor, and user. Protection is specified at the individual page level, where a page may be inaccessible, read-only, or read/write for each of the four access modes. Accessible pages can be restricted to have only data or instruction access.

Figure 10:
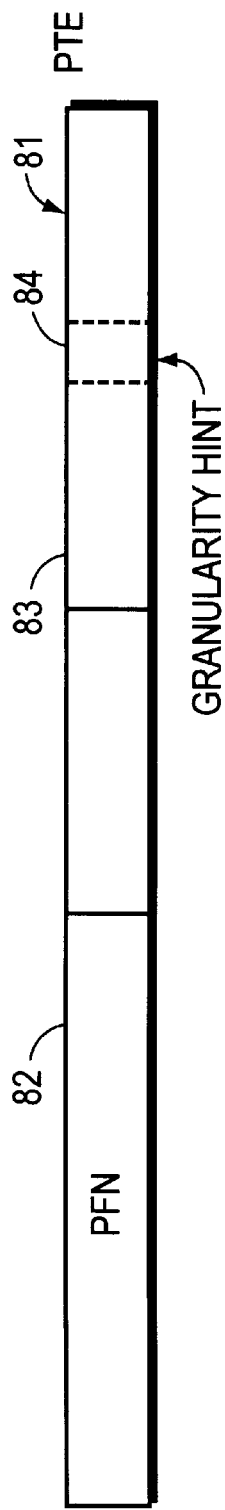
FIG. 10 is a diagram of the format of a page table entry used in the CPU of FIGS. 1–6.

A page table entry or PTE 81, as stored in the translation buffers 36 or 48 or in the page tables set up in the memory 12 by the operating system, is illustrated in FIG. 10. The PTE 81 is a quadword in width, and includes a 32-bit page frame number or PFN 82 at bits <63:32>, as well as certain software and hardware control information in a field 83 having bits <15:0> as set forth in Table A to implement the protection features and the like.

A particular feature is the granularity hint 84 in the two bits <6:5>. Software may set these bits to a non-zero value to supply a hint to the translation buffer 36 or 48 that blocks of pages may be treated as a larger single page. The block is an aligned group of $8^N$ pages, where N is the value of PTE<6:5>, e.g., a group of 1-, 8-, 64-, or 512-pages starting at a virtual address with (pagesize+3N) low-order zeros. The block is a group of physically contiguous pages that are aligned both virtually and physically; within the block, the low 3N bits of the PFNs describe the identity mapping (i.e., are used as part of the physical address by adding to the byte-within-page field) and the high (32–3N) PFN bits are all equal. Within the block, all PTEs have the same values for bits <15:0>, i.e., the same protection, fault, granularity, and valid bits of Table A Hardware may use this hint to map the entire block with a single TB entry, instead of eight, sixty-four or 512 separate TB entries. Note that a granularity hint might be appropriate for a large memory structure such as a frame buffer or non-paged pool that in fact is mapped into contiguous virtual pages with identical protection, fault, and valid bits. An example of the use of the granularity hint is the storage of a video frame for a display; here the block of data defining one frame may occupy sixty-four 8KB pages for a high-resolution color display, and so to avoid using sixty-four page table entries to map the physical addresses for this frame, one can be used instead. This avoids a large amount of swapping of PTEs from physical memory 12 to TB 48 in the case of a reference to the frame buffer to draw a vertical line on the screen, for example.

Figure 11:
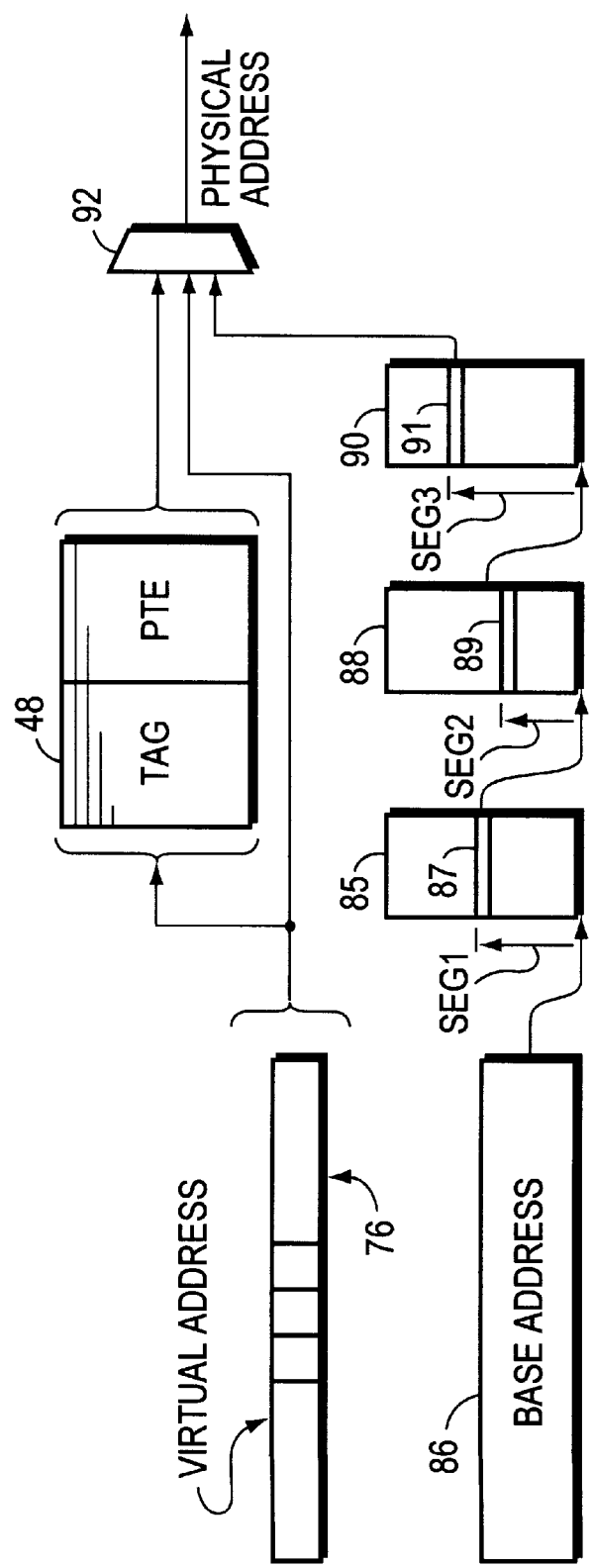
FIG. 11 is a diagram of the addressing translation mechanism used in the CPU of FIGS. 1–6.

Referring to FIG. 11, the virtual address on the bus 56 is used to search for a PTE in the TB 48, and, if not found, then Seg1 field 78 is used to index into a first page table 85 found at a base address stored in an internal register 86. The entry 87 found at the Seg1 index in table 85 is the base address for a second page table 88, for which the Seg2 field 79 is used to index to an entry 89. The entry 89 points to the base of a third page table 90, and Seg3 field 80 is used to index to a PTE 91, which is the physical page frame number combined with the byte offset 77 from the virtual address, in adder 92, to produce the physical address on bus 54. As mentioned above, the size of the byte offset 77 can vary depending upon the granularity hint 84.

Using the instruction formats of FIG. 8, the CPU of FIG. 1 executes an instruction set which includes nine types of instructions. These include (1) integer load and store instructions, (2) integer control instructions, (3) integer arithmetic, (4) logical and shift instructions, (5) byte manipulation, (6) floating point load and store, (7) floating point control, (8) floating point arithmetic, and (9) miscellaneous.

The integer load and store instructions use the memory instruction format 70 of FIG. 8 and include the following:

| | |
|---|---|
| LDA | Load Address |
| LDAH | Load Address High (shift high) |
| LDL | Load Sign Extended Longword |
| LDQ | Load Quadword |
| LDL_L | Load Sign Extended Longword Locked |
| LDQ_L | Load Quadword Locked |
| LDQ_U | Load Quadword Unaligned |
| STL | Store Longword |
| STQ | Store Quadword |
| STL_C | Store Longword Conditional |

-continued

| | |
|---|---|
| STQ_C | Store Quadword Conditional |
| STQ_U | Store Quadword Unaligned |

For each of these the virtual address is computed by adding register Rb to the sign-extended 16-bit displacement (or 65536 times the sign-extended displacement for LDAH).

For load instructions LDL and LDQ the source operand is fetched from memory at the computed address, sign extended if a longword, and written to register Ra. If the data is not naturally aligned an alignment exception is generated. For the store instructions STL and STQ the content of register Ra is written to memory at the computed virtual address. The load address instructions LDA and LDAH are like the load instructions LDL and LDQ, but the operation stops after the address is computed; the 64-bit computed virtual address is written to register Ra.

The Load Locked and Store Conditional instructions (LDL_L, LDQ_L, STL_L AND STQ_L) together provide an important feature of the architecture herein described. Particularly, this combination of instructions serves to ensure data integrity in a multiple processor or pipelined processor system by providing an atomic update of a shared memory location. As in the other instructions of this type, the virtual address is computed by adding the contents of the register Rb specified in the instruction to the sign-extended 16-bit displacement given in the instruction. When a LDL_L or LDQ_L instruction is executed without faulting, the CPU 10 records the target physical address from bus 54 to a locked physical address register 95 of FIG. 5, and sets a lock flag 96. If the lock flag 96 is still set when a store conditional instruction is executed, the store occurs, i.e., the operand is written to memory at the physical address, and the value of the lock flag 96 (a one) is returned in Ra and the lock flag set to zero; otherwise, if the lock flag is zero, the store to memory does not occur, and the value returned to Ra is zero.

If the lock flag for the CPU 10 is set, and another CPU 15 does a store within the locked range of physical addresses in memory 12, the lock flag 96 in CPU 10 is cleared. To this end, the CPU 10 monitors all writes to memory 12 and if the address in register 95 is matched, the flag 96 is cleared. The locked range is the aligned block of $2^N$ bytes that includes the locked physical address in register 95; this value $2^N$ may vary depending upon the construction of a CPU, and is at least eight bytes (minimum lock range is an aligned quadword)—the value is at most the page size for this CPU (maximum lock range is one physical page). The lock flag 96 of a CPU 10 is also cleared if the CPU encounters any exception, interrupt, or a call PALcode instruction.

The instruction sequence
LDQ_L
modify
STQ_L
BEQ
executed on the CPU 10 does an atomic read-modify-write of a datum in shared memory 12 if the branch falls through; if the branch is taken, the store did not modify the location in memory 12 and so the sequence may be repeated until it succeeds. That is, the branch will be taken if register Ra is equal to zero, meaning the value of the lock flag returned to Ra by the store conditional instruction is zero (the store did not succeed). This instruction sequence is shown in more detail in Appendix A.

If two load locked instructions are executed with no intervening store conditional, the second one overwrites the state of the first in lock flag 96 and register 95. If two store conditional instructions execute with no intervening load locked instruction, the second store always fails because the first clears the lock flag 96.

The load unaligned instructions LDQ_U and LDL_U are the same as a load LDQ or LDL, but the low-order 3-bits of the virtual address are cleared (the load unaligned instructions are used for byte addresses), so an aligned quadword or longword is fetched. Also, no alignment fault is signalled, as it would be for a simple LDQ or LDL instruction if a byte address (unaligned address) were seen. A load unaligned instruction is used for byte manipulation as will be described below. The store unaligned instruction STQ_U is likewise similar to the STQ instruction, but it removes the low-order three bits of the virtual address, and does not signal a fault due to the unaligned address.

The control type of instructions include eight conditional branch instructions, an unconditional branch, branch to subroutine, and a jump to subroutine instruction, all using the branch instruction format 71 or memory instruction format 70 of FIG. 8. These control instructions are: Using branch instruction format 71:

| | |
|---|---|
| BEQ | Branch if Register Equal to Zero |
| BNE | Branch if Register Not Equal to Zero |
| BLT | Branch if Register Less Than Zero |
| BLE | Branch if Register Less Than or Equal to Zero |
| BGT | Branch if Register Greater Than Zero |
| BGE | Branch if Register Greater Than or Equal to Zero |
| BLBC | Branch if Register Low Order Bit is Clear |
| BLBS | Branch if Register Low Order Bit is Set |
| BR | Unconditional Branch |
| BSR | Branch to Subroutine |

Using memory instruction format 70:

| | |
|---|---|
| JMP | Jump |
| JSR | Jump to Subroutine |
| RET | Return from Subroutine |
| JSR_COROUTINE | Jump to Subroutine Return |

For the conditional branch instructions, the register Ra is tested, and if the specified relationship is true, the PC is loaded with the target virtual address; otherwise, execution continues with the next sequential instruction. The displacement for either conditional or unconditional branches is treated as a signed longword offset, meaning it is shifted left two bits (to address a longword boundary), sign-extended to 64-bits, and added to the updated PC to form the target virtual address. The conditional or unconditional branch instructions are PC-relative only, the 21-bit signed displacement giving a forward/backward branch distance of +/−1M longwords.

For the unconditional branch instructions BR or BSR, the address of the instruction following the BR or BSR (i.e., the updated PC) is written to register Ra, followed by loading the PC with the target virtual address. BR and BSR do identical operations; they only differ in hints to branch-prediction logic—BSR is predicted as a subroutine call (pushes the return address on a branch-prediction stack), while BR is predicted as a branch (no push).

For the jump and return instructions, the address of the instruction following this instruction (the updated PC) is written to register Ra, followed by loading the PC with the target virtual address. The new PC is supplied from register Rb, with the two low-order bits of Rb being ignored. Ra arid Rb may specify the same register; the target calculation using the old value is done before the assignment of the new value.

All four instructions JMP, JSR, RET and JSR_COROUTINE do identical operations; they only differ in hints to branch-prediction logic. The displacement field of the instruction (not being used for a displacement) is used to pass this information. The four different "opcodes" set different bit patterns in disp<15:14>, and the hint operand sets disp<13:0>. These bits are intended to be used as follows:

| disp <15:14> | meaning | Predicted Target <15:0> | Prediction Stack Action |
|---|---|---|---|
| 00 | JMP | PC+{4*disp<13:0>} | — |
| 01 | JSR | PC+{4*disp<13:0>} | push PC |
| 10 | RET | Prediction stack | pop |
| 11 | JSR_CO | Prediction stack | pop, push PC |

This construction allows specification of the low 16-bits of a likely longword target address (enough bits to start a useful instruction cache 21 access early), and also allows distinguishing call from return (and from the other less frequent operations). Note that the information according to this table can only be used as a hint; correct setting of these bits can improve performance but is not needed for correct operation.

Thus, to allow the CPU to achieve high performance, explicit hints based on a branch-prediction model are provided as follows:

(1) For many implementations of computed branches (JSR, RET, JMP), there is a substantial performance gain in forming a good guess of the expected target instruction cache 21 address before register Rb is accessed.

(2) The CPU may be constructed with the first (or only) instruction cache 21 being small, no bigger than a page (8–64KB).

(3) Correctly predicting subroutine returns is important for good performance, so optionally the CPU may include a small stack of predicted subroutine return instruction cache 21 addresses.

To this end, the CPU 10 provides three kinds of branch-prediction hints: likely target address, return-address stack action, and conditional branch taken.

For computed branches (JSR/RET/JMP), otherwise unused displacement bits are used to specify the low 16-bits of the most likely target address. The PC-relative calculation using these bits can be exactly the PC-relative calculation used in conditional branches. The low 16-bits are enough to specify an instruction cache 21 block within the largest possible page and hence are expected to be enough for the branch-prediction logic to start an early instruction cache 21 access for the most likely target.

For all branches, hint or opcode bits are used to distinguish simple branches, subroutine calls, subroutine returns, and coroutine links. These distinctions allow the branch-prediction logic to maintain an accurate stack of predicted return addresses.

For conditional branches, the sign of the target displacement is used by the branch-prediction logic as a taken/fall-through hint. Forward conditional branches (positive displacement) are predicted to fall through. Backward conditional branches (negative displacement) are predicted to be taken. Conditional branches do not affect the predicted return address stack.

The integer arithmetic instructions perform add, subtract, multiply, and signed and unsigned compare operations on integers of registers 43, returning the result to an integer register 43. These instructions use either of the integer operate instruction formats 72 and 73 of FIG. 8 (three-register, or two-register and literal) and include the following:

| ADDL | Add Longword |
| --- | --- |
| ADDQ | Add Quadword |
| CMPEQ | Compare Signed Quadword Equal |
| CMPLT | Compare Signed Quadword Less Than |
| CMPLE | Compare Signed Quadword Less Than or Equal |
| CMPULT | Compare Unsigned Quadword Less Than |
| CMPULE | Compare Unsigned Quadword Less Than or Equal |
| MULL | Multiply Longword |
| MULQ | Multiply Quadword |
| UMULH | Unsigned Quadword Multiply HIgh |
| SUBL | Subtract Longword |
| SUBL | Subtract Quadword |

For the ADDL instructions, register Ra is added to register Rb or to a literal, and the sign-extended 32-bit sum is written to register Rc; the high-order 32-bits of Ra and Rb are ignored. For ADDQ instructions, register Ra is added to register Rb or to a literal, and the 64-bit sum is written to Rc. The unsigned compare instructions can be used to test for a carry; after adding two values using ADD, if the unsigned sum is less than either one of the inputs, there was a carry out of the most significant bit.

For the compare instructions, register Ra is compared to register Rb or a literal, and if the specified relationship is true the value one is written to the register Rc; otherwise, zero is written to register Rc.

The multiply instructions cause the register Ra to be multiplied by tile contents of the register Rb or a literal and the product is written to register Rc. For MULL the product is a 32-bit sign-extended value, while MULQ results in a 64-bit product. For the unsigned quadword multiply high instruction UMULH, register Ra and Rb or a literal are multiplied as unsigned numbers to produce a 128-bit result; the high-order 64-bits are written to register Rc.

For the subtract instructions, the register Rb or a literal is subtracted from the register Ra and the difference is written to the destination register Rc. The difference is a sign-extended 32-bit value for SUBL, or a 64-bit value for SUBQ. The unsigned compare instructions can be used to test for a borrow; if the unsigned minuend (Ra) is less unsigned than the unsigned subtrahend (Rb), there will be a borrow.

The logical instructions are of the operate instruction format and perform quadword Boolean operations. These instructions are as follows:

| AND | Logical Product |
| --- | --- |
| BIS | Logical Sum |
| XOR | Logical Difference |
| BIC | Logical Product with Complement |
| ORNOT | Logical Sum with Complement |
| EQV | Logical Equivalence |

These instructions perform the designated Boolean function between register Ra and register Rb or a literal, and write the result to the destination register Rc. The "NOT" function can be performed by doing an ORNOT with zero (Ra=R31).

The shift instructions are of the operate instruction format and perform left and right logical shift and right arithmetic shift in the shifter 41, as follows:

| SLL | Shift Left Logical |
| --- | --- |
| SRL | Shift Right Logical |
| SRA | Shift Right Arithmetic |

There is no arithmetic left shift instruction because, typically, where an arithmetic left shift would be used, a logical shift will do. For multiplying a small power of two in address computations, logical left shift is acceptable. Arithmetic left shift is more complicated because it requires overflow detection. Integer multiply should be used to perform arithmetic left shift with overflow checking. Bit field extracts can be done with two logical shifts; sign extension can be done with left logical shift and a right arithmetic shift. For the logical shifts, the register Ra is shifted logically left or right 0-to-63 bits by the count in register Rb or a literal, and the result is written to the register Rc, with zero bits propagated into the vacated bit positions. Likewise, for the shift right arithmetic instruction, the register Rb is right shifted arithmetically 0-to-63 bits by the count in the register Ra or a literal, and the result written to the register Rc, with the sign bit (Rbv<63>) propagated into the vacated bit positions.

An important feature which allows improved performance is the conditional move integer CMOV instruction. These instructions perform conditionals without a branch, and so maintain the sequentiality of the instruction stream. These instructions are of the operate instruction format, and include:

| CMOVEQ | Conditional Move if Register Equal to Zero |
| --- | --- |
| CMOVNE | Conditional Move if Register Not Equal to Zero |
| CMOVLT | Conditional Move if Register Less Than Zero |
| CMOVLE | Conditional Move if Register Less Than or Equal to Zero |
| CMOVGT | Conditional Move if Register Greater Than Zero |
| CMOVGE | Conditional Move if Register Greater Than or Equal to Zero |
| CMOVLBC | Conditional Move if Register Low Bit Clear |
| CMOVLBS | Conditional Move if Register Low Bit Set |

In executing these conditional move instructions, the register Ra is tested, and if the specified relationship is true, the value in register Rb is written to the register Rc. The advantage of having this alternative is in execution speed. For example, an instruction CMOVEQ Ra,Rb,Rc is exactly equivalent to

| | BNE Ra,label |
| --- | --- |
| | OR R31,Rb,Rc |
| label | ... | except that the CMOV way is likely in many implementations to be substantially faster. A branchless sequence for finding the greater of the contents of two registers, R1=MAX(R1,R2) is:

| CMPLT | R1,R2,R3 | ! R3=1 if R1<R2 |
| --- | --- | --- |
| CMOVNE | R3,R2,R1 | ! Do nothing if NOT(R1<R2) |
| | | ! Move R2 to R1 if R1<R2 |

Of course, the advantage of not using branches is that the instruction stream is fetched sequentially, and there is no need to flush the instruction cache or prefetch queue. A conditional move is faster than a branch even if the branch is predicted correctly. If the branch is not predicted correctly, the conditional move is much faster because it eliminates a branch operation.

Another important feature is providing instructions for operating on byte operands within registers. These allow full-width 64-bit memory accesses in the load/store instructions, yet combined with a variety of in-register byte manipulations a wide variety of byte operations are possible. The advantage is that of being able to use code written for architectures which allowed byte operations in memory, but yet constrain the memory accesses to full quadword aligned boundaries. The byte manipulation instructions are of the operate instruction format 72 or 73 of FIG. 8 and include compare byte, extract byte, mask byte, and zero byte instructions as follows:

| | |
|---|---|
| CMPBGE | Compare byte |
| EXTBL | Extract byte low |
| EXTWL | Extract word low |
| EXTLL | Extract longword low |
| EXTQL | Extract quadword low |
| EXTWH | Extract word high |
| EXTLH | Extract longword high |
| EXTQH | Extract quadword high |
| INSBL | Insert byte low |
| INSWL | Insert word low |
| INSLL | Insert longword low |
| INSQL | Insert quadword low |
| INSWH | Insert word high |
| INSLH | Insert longword high |
| INSQH | Insert quadword high |
| MSKBL | Mask byte low |
| MSKWL | Mask word low |
| MSKLL | Mask longword low |
| MSKQL | Mask quadword low |
| MSKWH | Mask word high |
| MSKLH | Mask longword high |
| MSKQH | Mask quadword high |
| ZAP | Zero bytes |
| ZAPNOT | Zero bytes not |

The compare byte instruction does eight parallel unsigned byte comparisons between corresponding bytes of the registers Ra and Rb (or Ra and a literal), storing the eight results in the low eight bits of the register Rc; the high 56-bits of the register Rc are set to zero. Bit-0 of Rc corresponds to byte-0, bit-1 of Rc to byte-1, etc. A result bit is set in Rc if the corresponding byte of Ra is greater than or equal to Rb (unsigned).

The extract byte instructions shift register Ra by 0–7 bytes (shifts right for low, shifts left for high), then extract one, two four or eight bytes into the register Rc, with the number of bytes to shift being specified by bits <2:0> of the register Rb, and the number of bytes to extract being specified in the function code; remaining bytes are filled with zeros. The extract byte high instructions shift left by a number of bytes which is eight minus the amount specified by bits <2:0> of register Rb. These extract byte instructions are particularly useful in byte manipulation where a non-aligned multi-byte datum in memory is to be operated upon, as set forth in the examples for byte extract in the Appendix.

The insert byte instructions shift bytes from the register Ra and insert them into a field of zeros, storing the result in the register Rc; register Rb, bits <2:0>, selects the shift amount of 0–7 bytes, and the function code selects the field width of one, two, four or eight bytes. These insert byte instructions can generate byte, word, longword or quadword datum that is placed in the register(s) at an arbitrary byte alignment.

The byte mask instructions MSKxL and MSKxH set selected bytes of register Ra to zero, storing the result in register Rc; register Rb<2:0> selects the starting position of the field of zero bytes, and the function code selects the maximum width, one, two four or eight bytes. The mask instructions generate a byte, word, longword or quadword field of zeros that can spread across to registers at an arbitrary byte alignment.

The zero bytes instructions ZAP and ZAPNOT set selected bytes of register Ra to zero, storing the result in register Rc; register Rb<7:0> selects the bytes to be zeroed, where bit-0 of Rb corresponds to byte-0, bit-1 of Rb corresponds to byte-1, etc. A result byte is set to zero if the corresponding bit of Rb is a one for ZAP and a zero for ZAPNOT.

In Appendix A, instruction sequences are given to illustrate how byte operations can be accomplished using the byte instructions set forth above.

The floating point instructions operate on floating point operands in each of five data formats: (1) F_floating, which is VAX single precision; (2) D_floating, which is VAX double precision with an 8-bit exponent; (3) G_floating, which is VAX double precision, with an 11-bit exponent; (4) S_floating, which is IEEE single precision; and T_floating, which is IEEE double precision, with an 11-bit exponent. The single precision values are loaded to the upper 32-bits of the 64-bit registers 61, with the lower 32-bits being zeros. Data conversion instructions are also provided to convert operands between floating-point and quadword integer formats, between single and double floating, and between quadword and longword integers. There is no global floating-point processor state for the CPU 10; i.e., the machine state is not switched between data formats, but instead the choice of data formats is encoded in each instruction.

Floating point numbers are represented with three fields: sign, exponent and fraction. The sign field is one bit, the exponent field is eight or eleven bits, and the fraction is 23-, 52- or 55-bits. Several different rounding modes are provided; for VAX formats, rounding is normal (biased) or chopped, while for IEEE formats rounding is of four types, normal (unbiased round to nearest), rounding toward plus infinity, rounding toward minus infinity, and round toward zero. There are six exceptions that can be generated by floating point instructions, all signalled by an arithmetic exception trap; these exceptions are invalid operation, division by zero, overflow, underflow, inexact result and integer overflow.

The memory instruction format 70 floating point instructions include the following:

| | |
|---|---|
| LDF | Load F_floating |
| LDD | Load D_floating (Load G_floating) |
| LDS | Load S_floating (Load Longword Integer) |
| LDT | Load T_floating (Load Quadword Integer) |
| STF | Store F_floating |
| STD | Store D_floating (Store G_floating) |
| STS | Store S_floating (Store Longword Integer) |
| STT | Store T_floating (Store Quadword Integer) |

Each of the load instructions fetches a floating point datum of the specified type from memory, reorders the bytes to conform to the floating point register format for this type, and writes it to the register Fa in register set 61, with the virtual address being computed by adding the register Fb to the sign-extended 16-bit displacement. The store instructions cause the contents of register Fa to be stored in the memory location at a virtual address computed by adding register Rb to the sign-extended 16-bit displacement, with the bytes being reordered on the way out to conform to the memory format for this floating point data type.

The floating point branch instructions operate in the same manner as the integer branch instructions discussed above, i.e., the value in a floating point register Fa is tested and the PC is conditionally changed. These floating point branch instructions include the following:

| | |
|---|---|
| FBEQ | Floating Branch Equal |
| FBNE | Floating Branch Not Equal |
| FBLT | Floating Branch Less Than |
| FBLE | Floating Branch Less Than or Equal |
| FBGT | Floating Branch Greater Than |
| FBGE | Floating Branch Greater Than or Equal |

Register Fa is tested, and if the specified relationship is true, the PC is loaded with the target virtual address; otherwise, execution continues with the next sequential instruction. The displacement is treated as a signed longword offset, meaning it is shifted left two bits to address a longword boundary, sign-extended to 64-bits, and added to the updated PC to form the target virtual address.

The operate instruction format instructions for floating point arithmetic include add, subtract, multiply, divide, compare, absolute value, copy and convert operations on 64-bit register values in the register 61. Each instruction specifies the source and destination formats of the values, as well as rounding mode and trapping modes to be used. These floating point operate instructions are listed in Table B.

The floating point conditional move instructions correspond to the integer conditional move instructions, except floating point registers 61 are used instead of the integer registers 43. As with the integer conditional move, these instructions can be used to avoid branch instructions.

The CPU 10 has several "miscellaneous" instructions in its instruction set, all using the instruction formats above, but not fitting into the categories discussed thus far. The following are the miscellaneous instructions:

| | |
|---|---|
| CALL_PAL | Call Privileged Architecture Library Routine |
| FETCH | Prefetch Data Block |
| FETCH_M | Prefetch, Modify Intent |
| DRAINT | Drain Instruction Pipeline |
| MB | Memory Barrier |
| RCC | Read Cycle Counter |

The CALL_PAL instruction using format 75 of FIG. 8 causes a trap to the PAL code (bits <25:0> of the instruction). This instruction is not issued until all previous instructions are guaranteed to complete without exceptions; if an exception occurs for one of these previous instructions, the continuation PC in the exception stack frame points to the CALL_Pal instruction.

The FETCH instruction prefetches an aligned 512-byte block surrounding the virtual address given by the contents of Rb. This address in Rb is used to designate an aligned 512-byte block of data. The operation is to attempt to move all or part of the 512-byte block (or a larger surrounding block) of data to a faster-access part of the memory hierarchy, in anticipation of subsequent Load or Store instructions that access the data. The FETCH instruction is thus a hint to the CPU 10 that may allow faster execution. If the construction of the particular CPU does not implement this technique, then the hint may be ignored. The FETCH M instruction gives an additional hint that modifications (stores) to some or all of the data is anticipated; this gives faster operation in some writeback cache designs because the data block will be read into the cache as "owned" so when a write is executed to the data of the block in the cache it will not generate a fault to go off and claim ownership. No exceptions are generated by FETCH; if a Load (or Store in the case of FETCH_M) using the same address would fault, the prefetch request is ignored. The FETCH instruction is intended to help software bury memory latencies on the order of 100-cycles; it is unlikely to matter (or be implemented) for memory latencies on the order of 10-cycles, since code scheduling should be used to bury such short latencies.

The DRAINT instruction stalls instruction issuing until all prior instructions are guaranteed to complete without incurring arithmetic traps. This allows software to guarantee that, in a pipelined implementation, all previous arithmetic instructions will complete without incurring any arithmetic traps before any instruction after the DRAINT are issued. For example, it should be used before changing an exception handler to ensure that all exceptions on previous instructions are processed in the current exception-handling environment.

The memory barrier instruction MB guarantees that all future loads or stores will not complete until after all previous loads and stores have completed. In the absence of an MB instruction, loads and stores to different physical locations are allowed to complete out of order. The MB instruction allows memory accesses to be serialized.

The read cycle counter instruction RCC causes the register Ra to be written with the contents of the CPU cycle counter. The low order 32-bits of the cycle counter is an unsigned integer that increments once per N CPU cycles, where N is an implementation-specific integer in the range 1-to-16. The counter wraps around to zero at an implementation-specific value.

While this invention has been described with reference to specific embodiments, this description is not meant to be construed in a limiting sense. Various modifications of the disclosed embodiments, as well as other embodiments of the invention, will be apparent to persons skilled in the art upon reference to this description. It is therefore contemplated that the appended claims will cover any such modifications or embodiments as fall within the true scope of the invention.

TABLE A

Page Table Entry
Fields in the page table entry are interpreted as follows:

| Bits | Description |
|---|---|
| <0> | Valid (V) - Indicates the validity of the PFN field. |
| <1> | Fault On Read (FOR) - When set, a Fault On Read exception occurs on an attempt to read any location in the page. |
| <2> | Fault On Write (FOW) - When set, a Fault On Write exception occurs on an attempt to write any location in the page. |
| <3> | Fault on Execute (FOE) - When set, a Fault On Execute exception occurs on an attempt to execute an instruction in the page. |
| <4> | Address Space Match (ASM) - When set, this PTE matches all Address Space Numbers. For a given VA, ASM must be set consistently in all processes. |
| <6:5> | Granularity hint (GH). |
| <7> | Reserved for future use. |

TABLE A-continued

Page Table Entry
Fields in the page table entry are interpreted as follows:

| Bits | Description |
|---|---|
| <8> | Kernel Read Enable (KRE) - This bit enables reads from kernel mode. If this bit is a 0 and a LOAD or instruction fetch is attempted while in kernel mode, an Access Violation occurs. This bit is valid even when V = 0. |
| <9> | Executive Read Enable (ERE) - This bit enables reads from executive mode. If this bit is a 0 and a LOAD or instruction fetch is attempted while in executive mode, an Access Violation occurs. This bit is valid even when V = 0. |
| <10> | Supervisor Read Enable (SRE) - This bit enables reads from supervisor mode. If this bit is a 0 and a LOAD or instruction fetch is attempted while in supervisor mode, an Access Violation occurs. This bit is valid even when V = 0. |
| <11> | User Read Enable (URE) - This bit enables reads from user mode. If this bit is a 0 and a LOAD or instruction fetch is attempted while in user mode, an Access Violation occurs. This bit is valid even when V = 0. |
| <12> | Kernel Write Enable (KWE) - This bit enables writes from kernel mode. If this bit is a 0 and a STORE is attempted while in kernel mode, an Access Violation occurs. This bit is valid even when V = 0. |
| <13> | Executive Write Enable (EWE) - The bit enables writes from executive mode. If this bit is a 0 and a STORE is attempted while in executive mode, an Access Violation occurs. |
| <14> | Supervisor Write Enable (SWE) - This bit enables writes from supervisor mode. If this bit is a 0 and a STORE is attempted while in supervisor mode, an Access Violation occurs. |
| <15> | User Write Enable (UWE) - This bit enables writes from user mode. If this bit is a 0 and a STORE is attempted while in user mode, an Access Violation occurs. |
| <31:16> | Reserved for software. |
| <63:32> | Page Frame Number (PFN) - The PFN field always points to a page boundary. If V is set, the PFN is concatenated with the Byte Within Page bits of the virtual address to obtain the physical address. If V is clear, this field may be used by software. |

TABLE B

Floating Point Arithmetic Operations

| Mnemonic | Bit operation |
|---|---|
| CPYS | Copy Sign |
| CPYSN | Copy Sign Negate |
| CPYSE | Copy Sign and Exponent |
| CPYSEE | Copy Sign and Extended Exponent |
| CVTQL | Convert Quadword to Longword |
| CVTLQ | Convert Longword to Quadword |
| FCMOV | Floating Conditional Move |

TABLE B-continued

Floating Point Arithmetic Operations

| Mnemonic | Arithmetic operation |
|---|---|
| ADDF | Add F_floating |
| ADDD | Add D_floating |
| ADDG | Add G_floating |
| ADDS | Add S_floating |
| ADDT | Add T_floating |
| CMPD | Compare D_floating |
| CMPG | Compare G_floating |
| CMPS | Compare S_floating |
| CMPT | Compare T_floating |
| CVTDQ | Convert D_floating to Quadword |
| CVTGQ | Convert G_floating to Quadword |
| CVTSQ | Convert S_floating to Quadword |
| CVTTQ | Convert T_floating to Quadword |
| CVTQD | Convert Quadword to D_floating |
| CVTQF | Convert Quadword to F_floating |
| CVTQG | Convert Quadword to G_floating |
| CVTQS | Convert Quadword to S_floating |
| CVTQT | Convert Quadword to T_floating |
| CVTFG | Convert F_floating to G_floating |
| CVTDF | Convert D_floating to F_floating |
| CVTGF | Convert G_floating to F_floating |
| CVTST | Convert S_floating to T_floating |
| CVTTS | Convert T_floating to S_floating |
| DIVF | Divide F_floating |
| DIVD | Divide D_floating |
| DIVG | Divide G_floating |
| DIVS | Divide S_floating |
| DIVT | Divide T_floating |
| MULF | Multiply F_floating |
| MULD | Multiply D_floating |
| MULG | Multiply G_floating |
| MULS | Multiply S_floating |
| MULT | Multiply T_floating |
| SUBF | Subtract F_floating |
| SUBD | Subtract D_floating |
| SUBG | Subtract G_floating |
| SUBS | Subtract S_floating |
| SUBT | Subtract T_floating |

APPENDIX A

BYTE MANIPULATION

A1. Software notes for Compare byte CMPBGE instruction:

The result of CMPBGE can be used as an input to ZAP and ZAPNOT.
To scan for a byte of zeros in a character string, do:
    <initialize R1 to aligned QW address of string>
LOOP:

```
    LDQ      R2,0 (R1)      ; Pickup 8 bytes
    LDA      R1,8 (R1)      ; Increment string pointer
    CMPBGE   R31,R2,R3      ; If NO bytes of zero, R3 <7:0>=0
    BEQ      R3,LOOP        ; Loop if no terminator byte found
    . . .                   ; At this point, R3 can be used to determine
```

APPENDIX A-continued

BYTE MANIPULATION

```
                                    ; which byte terminated
To compare two character strings for greater/less, do:
        <initialize R1 to aligned QW address of string1>
        <initialize R2 to aligned QW address of string2>
LOOP:
        LDQ       R3,O (R1)         ; Pick up 8 bytes of string1
        LDA       R1,8 (R1)         ; Increment string1 pointer
        LDQ       R4,0 (R2)         ; Pick up 8 bytes of string2
        LDA       R2,8 (R2)         ; Increment string2 pointer
        XOR       R3,R4,R5          ; Test for all equal bytes
        BEQ       R3,LOOP           ; Loop if all equal
        CMPBGE    R31,R5,R5         ;
        . . .                       ; At this point, RS can be used to index
                                    ; a table lookup of the first not-equal
                                    ; byte position
To range-check a string of characters in R1 for '0'. . . '9', do:
        LDQ       R2,lit0s          ; Pick up 8 bytes of the character BELOW '0'
                                    ; '////////'
        LDQ       R3,lit9s          ; Pick up 8 bytes of the character ABOVE '9'
                                    ; ':::::::::'
        CMPBGE    R2,R1,R4          ; Some R4 <i>=1 if character is LT than '0'
        CMPBGE    R1,R3,R5          ; Some R5 <i>=1 if character is GT than '9'
        BNE       R4,ERROR          ; Branch if some char too low
        BNE       R5,ERROR          ; Branch if some char too high
A2. Software notes for Byte Extract instructions:

The comments in the examples below assume that (X mod 8) =5,
the value of the aligned quadword containing X is CBAxxxxx, and
the value of the aligned quadword containing X+7 is yyyHGFED.
The examples below are the most general case; if more information
is known about the value or intended alignment of X, shorter
sequences can be used.
The intended sequence for loading a quadword from unaligned
address X is:
        LDQ_U     R1,X              ; Ignores va<2:0>, R1 = CBAxxxxx
        LDQ_U     R2,X+7            ; Ignores va<2:0>, R2 = yyyHGFED
        LDA       R3,X              ; R3<2:0> = (X mod 8) = 5
        EXTQL     R1,R3,R1          ; R1 = 00000CBA
        EXTQH     R2,R3,R2          ; R2 = HGFED000
        OR        R2,R1,R1          ; R1 = HGFEDCBA
The intended sequence for loading and zero-extending a longword
from unaligned address X is:
        LDQ_U     R1,X              ; Ignores va<2:0>, R1 = CBAxxxxx
        LDQ_U     R2,X+3            ; Ignores va<2:0>, R2 = yyyyyyyD
        LDA       R3,X              ; R3<2:0> = (X mod 8) = 5
        EXTLL     R1,R3,R1          ; R1 = 00000CBA
        EXTLH     R2,R3,R2          ; R2 = 00000D000
        OR        R2,R1,R1          ; R1 = 0000DCBA
The intended sequence for loading and sign-extending a longword
from unaligned address X is:
        LDQ_U     R1,X              ; Ignores va<2:0>, R1 = CBAxxxxx
        LDQ_U     R2,X+3            ; Ignores va<2:0., R2 = yyyyyyyD
        LDA       R3,X              ; R3<2:0> = (X mod 8) = 5
        EXTLL     R1,R3,R1          ; R1 = 00000CBA
        EXTLH     R2,R3,R2          ; R2 = 0000D000
        OR        R2,R1,R1          ; R1 = 0000DCBA
        SLL       R1,R32,R1         ; R1 = DCBA0000
        SRA       R1,R32,R1         ; R1 = ssssDCBA
The intended sequence for loading and zero-extending a
word from unaligned address X is:
        LDQ_U     R1,X              ; Ignores va<2:0>, R1 = yBAxxxxx
        LDQ_U     R2,X+1            ; Ignores va<2:0>, R2 = yBAxxxxx
        LDA       R3,X              ; R3<2:0> = (X mod 8) = 5
        EXTWL     R1,R3,R1          ; R1 = 000000BA
        EXTWH     R2,R3,R2          ; R2 = 00000000
        OR        R2,R1,R1          ; R1 = 000000BA
The intended sequence for loading and sign-extending a word
from unaligned address X is:
        LDQ_U     R1,X              ; Ignores va<2:0>, R1 = yBAxxxxx
        LDQ_U     R2,X+1            ; Ignores va<2:0>, R2 = yBAxxxxx
        LDA       R3,X              ; R3<2:0> = (X mod 8) = 5
        BXTWL     R1,R3,R1          ; R1 = 000000BA
        EXTWH     R2,R3,R2          ; R2 = 00000000
        OR        R2,R1,R1          ; R1 = 000000BA
        SLL       R1,R48,R1         ; R1 = BA000000
        SRA       R1,R48,R1         ; R1 = ssssssBA
The intended sequence for loading and zero-extending
```

APPENDIX A-continued

BYTE MANIPULATION a byte from address X is:

```
       LDQ_U    R1,X         ; Ignores va<2:0>, R1 = yyAxxxxx
       LDA      R3,X         ; R3<2:0> = (X mod 8) = 5
       EXTBL    R1,R3,R1     ; R1 = 0000000A
```

The intended sequence for loading and sign-extending a
byte from address X is:

```
       LDQ_U    R1,X         ; Ignores va<2:0>, R1 = yyAxxxxx
       LDA      R3,X         ; R3<2:0> = (X mod 8) = 5
       EXTBL    R1,R3,R1     ; R1 = 0000000A
       SLL      R1,R56,R1    ; R1 = A0000000
       SRA      R1,R56,R1    ; R1 = ssssssA
```

Optimized examples:

Assume that a word fetch is needed from 10(R3), where R3 is
intended to contain a longword-aligned address. The optimized
sequences below take advantage of the known constant offset, and
the longword aligmnent (hence a single aligned longword contains
the entire word). The sequences generate a Data Alignment Fault if R3
does not contain a longword-aligned address.

The intended sequence for loading and zero-extending an
aligned word from 10(R3) is:

```
       LDL      R1,8(R3)     ; R1 = ssssBAxx
                             ; Faults if R3 is not longword aligned
       EXTWL    R1,#2,R1     ; R1 = 000000BA
```

The intended sequence for loading and sign-extending an
aligned word from 10(R3) is:

```
       LDL      R1,8(R3)     ; R1 = ssssBAxx
                             ; Faults if R3 is not longword aligned
       SRA      R1,#16,R1    ; R1 = ssssssBA
```

A3. Software notes for byte mask instructions:

The comments in the examples below assume that (X mod 8)-5,
the value of the aligned quadword containing X is CBAxxxxx,
the value of the aligned quadword containing X + 7 is yyyHGFED,
and the value to be stored from R5 is hgfedcba. The examples below are
the most general case; if more information is known about the
value or intended alignment of X, shorter sequences can be used.

The intended sequence for storing an unaligned quadword
R5 at address X is:

```
       LDA      R6, X        ! R6<2:0>= (X mod 8) = 5
       LDQ_U    R2, X+7      ! Ignores va<2:0>, R2 = yyyHGFED
       LDQ_U    R1, X        ! Ignores va<2:0>, R1 = CBAxxxxx
       INSQ_H   R5, R6, R4   ! R4 = 000hgfed
       INSQL    R5, R6, R3   ! R3 = cba00000
       MSKQH    R2, R6, R2   ! R2 = yyy00000
       MSKQL    R1, R6, R1   ! R1 = 000xxxxx
       OR       R2, R4, R2   ! R2 = yyyhgfed
       OR       R1,R3,R1     ! R1 = cbaxxxxx
       STQ_U    R2, X + 7    ! Must store high then low for
       STQ_U    R1, X        ! degenerate case of aligned QW
```

The intended sequence for storing an unaligned longword R5 at X is:

```
       LDA      R6, X        ! R6<2:0> = (X mod 8) = 5
       LDQ_U    R2, X + 3    ! Ignores va<2:0>, R2 = yyyyyyyD
       LDQ_U    R1, X        ! Ignores va<2:0>, R1 = CBAxxxxx
       INSLH    R5, R6, R4   ! R4 = 0000000d
       INSLL    R5, R6, R3   ! R3 = cba000000
       MSKLH    R2, R6, R2   ! R2 = yyyyyyy0
       MSKLL    R1, R6, R1   ! R1 = cbaxxxxx
       OR       R2, R4, R2   ! R2 = yyyyyyyd
       OR       R1, R3, R1   ! R1 = cbaxxxxx
       STQ_U    R2, X + 3    ! Must store high then low for
       STQ_U    R1, X        ! degenerate case of aligned
```

The intended sequence for storing an unaligned word R5 at X is:

```
       LDA      R6, X        ! R6<2:0> = (X mod 8) = 5
       LDQ_U    R2, X + 1    ! Ignores va<2:0>, R2 = yBAxxxxx
       LDQ_U    R1, X        ! Ignores va<2:0>, R1 yBAxxxxx
       INSWH    R5, R6, R4   ! R4 = 00000000
       INSWL    R5, R6, R2   ! R3 = 0ba00000
       MSKWH    R2, R6, R2   ! R2 = yBAxxxxx
       MSKWL    R1, R6, R1   ! R1 = y00xxxxx
       OR       R2, R4, R2   ! R2 = yBAxxxxx
       OR       R1, R3, R1   ! R1 = ybaxxxxx
       STQ_U    R2, X + 1    ! Must store high then low for
       STQ_U    R1, X        ! degenerate case of aligned
```

The intended sequence for storing a byte R5 at X is:

```
       LDA      R6, X        ! R6<2:0> = (X mod 8) = 5
       LDQ_U    R1, X        ! Ignores va<2:0>, R1 = yyAxxxxx
       INSBL    R5, R6, R3   ! R3 = 00a00000
```

APPENDIX A-continued

BYTE MANIPULATION

```
        MSKBL      R1, R6, R1      ! R1 = yy0xxxxx
        OR         R1, R3, R1      ! R1 = yyaxxxxx
        STQ_U      R1, X
```

A4. Additional Detail of Byte Insert instruction:

The Byte Insert instructions perform the following operation:
```
    CASE opcode BEGIN
        INSBL: byte_mask <- 00000001 (bin)
        INSWx: byte_mask <- 00000011 (bin)
        INSLx: byte_mask <- 00001111 (bin)
        INSQx: byte_mask <- 11111111 (bin)
    ENDCASE
    byte_mask <- LEFT_SHIFT(byte_mask, rbv <2:0>)
    CASE opcode BEGIN
        INSxL:
            byte_loc <- Rbv<2:0>*8
            temp <- LEFT_SHIFT(Rav, byte_loc <5:0>)
            Rc <- BYTE_ZAP (temp, NOT(byte_mask<7:0>))
        INSxH:
            byte_loc <- 64 - Rbv<2:0>*8
            temp <- RIGHT_SHIFT (Rav, byte_loc<5:0>)
            Rc <- BYTE_ZAP (temp, NOT(byte mask<15:8>))
    ENDCASE
```

A5. Additional Detail of Byte Extract instruction:

The Byte Extract instructions perform the following operation:
```
    CASE opcode BEGIN
        EXTBL: byte_mask <- 00000001 (bin)
        EXTWx: byte_mask <- 00000011 (bin)
        EXTLx: byte_mask <- 00001111 (bin)
        EXTQx: byte_mask <- 11111111 (bin)
    ENDCASE
    CASE opcode BEGIN.
        EXTxL:
            byte_loc <- Rbv<2:0>*8
            temp <- LEFT_SHIFT(Rav, byte_loc <5:0>)
            Rc <- BYTE_ZAP (temp, NOT(byte_mask<7:0>))
        EXTxH:
            byte_loc <- 64 - Rbv<2:0>*8
            temp <- RIGHT_SHIFT (Rav, byte_loc<5:0>)
            Rc <- BYTE_ZAP (temp, NOT(byte mask<15:8>))
    ENDCASE
```

A6. Atomic Byte Write:

An atomic byte write operation is accomplished by the following instruction sequence:
```
        LDA R6, X           ;Load address to R6 from memory loc. X
        BIC R6,#7,R7        ;R6 BIC using literal #7, result to R7
retry:  LDQ_L R1,0(R7)      ;Load Locked from R7 address
        INSBL R5,R6,R3      ;Insert Byte
        MSKBL R1,R6,R1      ;Mask Byte
        OR R1,R3,R1         ;
        STQ_C R1,0(R7)      ;Store conditional to same location
        BNE R1,retry
```

What is claimed is:

1. A method of operating a pipelined processor, said processor having a plurality of registers in a register set, and having a program counter for counting sequential addresses in memory, comprising the steps of:

fetching instructions from said sequential addresses in memory using said program counter, and decoding said instructions before executing said instructions, detecting a jump instruction in the fetched instructions, said jump instruction including an opcode, a register specifier and a memory address specifier, and extracting from said register specifier of said jump instruction an identification of a first of said registers for storing a first address which is a target address of said jump instruction, and extracting from said memory address specifier of said jump instruction a second address which is a prediction of said target address; and prefetching an instruction from said second address rather than from said sequential addresses, before said jump instruction is executed and before said first address is available in said first register.

2. A method according to claim 1 wherein said instructions are of fixed length, and said jump instruction also includes an address of a second register for storing a content of the program counter when the jump instruction is executed, and wherein said memory address specifier is in a displacement field of said jump instruction.

3. A method according to claim 1 wherein said second address which is said prediction of said target address is stored in said jump instruction upon compiling a program including said jump instruction.

4. A method according to claim 2 wherein said displacement field includes an indicator designating said jump instruction as a jump instruction, a jump-to-subroutine instruction, or a return instruction.

5. A method according to claim 1 including the step of storing a content of the program counter in a prediction stack upon execution of said jump instruction.

6. A method according to claim 5 including the step of prefetching an instruction using an address from said prediction stack before executing a return from subroutine instruction.

7. A method according to claim 4 including the step of pushing a content of the program counter to a prediction stack upon executing sad jump-to-subroutine instruction.

8. A method of operating a processor having instructions of fixed length, said processor having a plurality of registers, and having a program counter, comprising the steps of:

generating a jump instruction, said jump instruction having an opcode, having a first field which identifies a first register for storing a content of said program counter when the jump instruction is executed, and having a second field which identifies a second register in which is stored a jump target address for loading into the program counter when the jump instruction is executed, and a displacement field which is not necessarily used upon execution;

storing in said displacement field a third field which is a predicted target address for optionally prefetching by said processor before said jump instruction is executed and before said jump target address is loaded to said second register.

9. A method according to claim 8 wherein said step of storing is performed upon compiling a program including said jump instruction.

10. A method according to claim 8 wherein said step of storing includes storing in a field of said displacement field an indicator designating said jump instruction as a jump instruction, a jump-to-subroutine instruction, or a return instruction.

11. A method according to claim 10 including the step of storing said content of the program counter in a prediction stack upon execution of said jump instruction.

12. A method according to claim 8, wherein said step of storing includes storing in a field of said displacement field an indicator designating said jump instruction as a return instruction, and wherein the method includes the step of prefetching an instruction using an address from a prediction stack before executing said jump instruction.

13. A method according to claim 8, wherein said step of storing includes storing in a field of said displacement field information designating said jump instruction as a jump-to-subroutine instruction, and wherein the method further includes the step of pushing said content of the program counter to a prediction stack upon executing said jump instruction.

14. A processor, said processor having a plurality of registers in a register set, and having a program counter, comprising:

means for fetching instructions from sequential addresses in memory using said program counter, and means for decoding said instructions before executing said instructions, means for detecting a jump instruction in said fetched instructions, said jump instruction including an opcode, a first register specifier, a second register specifier, and a memory address specifier, and extracting from said first register specifier of said jump instruction a first identification of a first of said registers for containing a content of said program counter, and extracting from said second register specifier of said jump instruction a second identification of a second of said registers containing a jump target address of said jump instruction, and extracting from said memory address specifier of said jump instruction a predicted target address; and means for prefetching an instruction from memory at said predicted target address rather than from said sequential addresses, before said jump instruction is executed and before said jump target address is loaded into said second register.

15. A processor according to claim 14 wherein said instructions are of fixed length, and wherein said memory address specifier is in a displacement field of the jump instruction.

16. A processor according to claim 15 wherein said predicted target address is stored in said displacement field of said jump instruction upon compiling said sequence of instructions.

17. A processor according to claim 15 wherein said displacement field includes an indicator designating said jump instruction as a jump instruction, a jump-to-subroutine instruction, or a return instruction.

18. A processor according to claim 14 including means for storing a content of the program counter in a prediction stack upon execution of said jump instruction.

19. A processor according to claim 18 including means for prefetching an instruction using an address from said prediction stack before executing a return from subroutine instruction.

20. A processor according to claim 14 including means for pushing a content of the program counter to a prediction stack upon executing a jump to subroutine instruction.

* * * * *